(12) United States Patent
Khoshnegar Shahrestani et al.

(10) Patent No.: US 12,470,688 B2
(45) Date of Patent: Nov. 11, 2025

(54) OPTICAL DIFFRACTIVE DISPLAY

(71) Applicant: Authentix, Inc., Addison, TX (US)

(72) Inventors: Milad Khoshnegar Shahrestani, Coquitlam (CA); Clinton K. Landrock, North Vancouver (CA)

(73) Assignee: Authentix, Inc., Addison, TX (US)

( * ) Notice: Subject to any disclaimer, the term of this patent is extended or adjusted under 35 U.S.C. 154(b) by 301 days.

(21) Appl. No.: 18/257,640

(22) PCT Filed: Dec. 17, 2021

(86) PCT No.: PCT/IB2021/061979
§ 371 (c)(1),
(2) Date: Jun. 15, 2023

(87) PCT Pub. No.: WO2022/130346
PCT Pub. Date: Jun. 23, 2022

(65) Prior Publication Data
US 2024/0121376 A1 Apr. 11, 2024

Related U.S. Application Data

(60) Provisional application No. 63/127,638, filed on Dec. 18, 2020.

(51) Int. Cl.
*H04N 13/351* (2018.01)
*B82Y 20/00* (2011.01)
(Continued)

(52) U.S. Cl.
CPC ............ *H04N 13/351* (2018.05); *B82Y 20/00* (2013.01); *G02B 5/1819* (2013.01);
(Continued)

(58) Field of Classification Search
CPC .... B82Y 20/00; H04N 13/302; H04N 13/351; G02B 5/1819; G02B 5/1861; G02B 2207/101
See application file for complete search history.

(56) References Cited

U.S. PATENT DOCUMENTS 6,621,607 B1 9/2003 Odhner et al.
2001/0033419 A1 10/2001 Odhner et al.
(Continued)

OTHER PUBLICATIONS

Foreign Communication from Related Application—International Search Report and Written Opinion of the International Searching Authority, International Application No. PCT/IB2021/061979, dated Mar. 24, 2022 10 pages.

*Primary Examiner* — Mohamed A. Wasel
(74) *Attorney, Agent, or Firm* — Conley Rose, P.C.; Rodney B. Carroll

(57) ABSTRACT

A diffractive display for displaying multiple images, each at a unique view zone, includes multiple micro-pixels, each having micro-facets, each micro-facet having a surface normal non-parallel to the surface normal of other micro-facets of the micro-pixel, each micro-facet having a diffractive nano-structure array. Each diffractive nano-structure array has a viewing angle at which incident light is diffracted from the diffractive nano-structure array. The diffracted light has a hue and an intensity based on properties of the diffractive nano-structure array, and, for each of the images, each of the micro-pixels includes at least one diffractive nano-structure array for which the viewing angle corresponds to the view zone the image, such that each of the images is composed of the diffracted light from at least one diffractive nano-structure array from each of the micro-pixels.

17 Claims, 12 Drawing Sheets

(51) Int. Cl.
   *G02B 5/18* (2006.01)
   *H04N 13/302* (2018.01)
(52) U.S. Cl.
   CPC ......... *G02B 5/1861* (2013.01); *H04N 13/302* (2018.05); *G02B 2207/101* (2013.01)

(56) References Cited

U.S. PATENT DOCUMENTS

| | | | |
|---|---|---|---|
| 2017/0199420 A1* | 7/2017 | Shin | G02B 6/005 |
| 2018/0188441 A1* | 7/2018 | Fattal | G02B 30/27 |
| 2018/0224697 A1* | 8/2018 | Yuki | G02F 1/1323 |
| 2019/0155105 A1* | 5/2019 | Aieta | G02B 6/0036 |
| 2020/0033526 A1* | 1/2020 | Fattal | G02B 5/1819 |
| 2020/0341174 A1 | 10/2020 | Keshavarz Akhlaghi et al. | |
| 2021/0103145 A1 | 4/2021 | You et al. | |

* cited by examiner

OPTICAL DIFFRACTIVE DISPLAY

CROSS-REFERENCE TO RELATED APPLICATION

This application is a U.S. National Phase Application of PCT/IB2021/061979, filed Dec. 17, 2021, which claims the benefit of U.S. Application No. 63/127,638, filed Dec. 18, 2020, the entire contents both of which are incorporated herein by reference.

FIELD

The present disclosure relates to optical diffractive displays.

BACKGROUND

When the wavefront of an electromagnetic wave consisting of a spectrum of wavelengths passes through a periodic nano-structure array, its energy will be dispersed into multiple channels if the periodicity of nano-structure array is on the order of the passing wavelengths. This phenomenon is called diffraction and the corresponding dispersion channels are called diffraction orders.

From the ray optics point of view, the diffraction channels are not necessarily aligned with the incoming wavefront and their angular separation depends on the periodicity of the nano-structure array and the order of diffraction. Each diffraction order retains a unique combination of a polar and an azimuthal angle in space, which polar and azimuthal angles are utilized to describe the orientation of the light beam diffracted from the nano-structure array. The fundamental or first order of diffraction from a nano-structure carries the dominant portion of the diffraction energy.

Optical devices may be constructed utilizing diffractive nano-structures, such as nano-hole diffractive arrays and common types of diffraction gratings. A specific type of periodic nano-structure arrays with a sawtooth profile, referred to as blazed gratings, may be incorporated into a diffractive display.

Blazed gratings offer a high diffraction efficiency for a specific wavelength and diffraction order such that the optical power channeled into the higher diffraction orders is much lower than the optical power channeled into the fundamental order when the blazed grating is lit with an incident beam of wavelength approximately equal to the periodicity of the blazed grating, this wavelength referred to as the blaze wavelength. For this reason, blazed gratings are utilized in diffractive displays function as efficient colour filters for a certain blaze wavelength, which depends on the geometry of the blazed gratings and the angle of the incident beam.

The polar and azimuthal angles of the fundamental diffraction order at the blaze wavelength is dependent on the blaze grating's periodicity and the angle of the incident beam. Therefore, a diffractive display constructed by an ensemble of blazed gratings will deliver the highest optical power at a certain viewing angle with respect to a planewave incident light and very little optical power away from these viewing angles.

Improvements in diffractive displays are desirable.

BRIEF DESCRIPTION OF THE DRAWINGS

Embodiments of the present disclosure will now be described, by way of example only, with reference to the attached Figures.

DETAILED DESCRIPTION

Figure 1A:
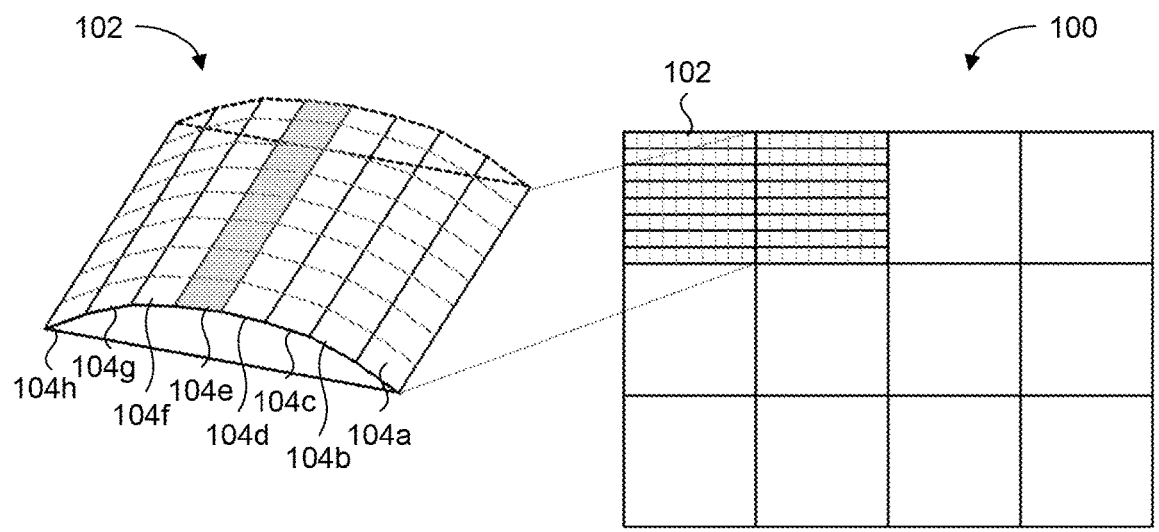
FIGS. 1A and 1B show example diffractive displays according to an embodiment of the present disclosure.

Embodiments of the present disclosure relate to nano-optical devices, which are referred to herein as diffractive displays, designed to operate both in ambient lighting, i.e., passive diffractive display, and under guided lighting, i.e., active diffractive displays. Diffractive displays of the present disclosure may be configured to be viewable over a wide view zone or provide multiple parallax true colour animations. Diffractive displays of the present disclosure may be utilized in any application in which a wide field of view is desired including, for example, for providing 3-dimensional (3D) diffractive displays, augmented reality or virtual reality, and anti-counterfeiting security features.

The diffractive displays according to the present disclosure have increased viewability and viewability that can be more flexibly tuned relative to conventional diffractive displays by overlaying the diffractive nano-structures of each pixel of the diffractive display on multiple surfaces, referred to herein as "micro-facets", that are angled relative to one another.

In an embodiment, the present disclosure provides a diffractive display for displaying a plurality of images, each image displayed at a unique view zone, the diffractive display includes a plurality of micro-pixels, each pixel comprising a plurality of micro-facets, each micro-facet of a micro-pixel having a surface normal that is non-parallel to the surface normal of the other micro-facets of the pixel, each micro-facet having at least one diffractive nano-structure array, wherein each of the at least one diffractive nano-structure array has a viewing angle at which incident light is diffracted from the diffractive nano-structure array as diffracted light, the viewing angle being based on an angle of the surface normal of the micro-facet on which the diffractive nano-structure array is provided and an azimuthal angle and a polar angle of the fundamental order of diffraction of the diffractive nano-structure array, and the diffracted light having a hue and an intensity based on properties of the diffractive nano-structure array, and wherein, for each of the plurality of images, each of the plurality of micro-pixels includes at least one diffractive nano-structure array for which the viewing angle corresponds to the view zone the image, such that each of the plurality of images is composed of the diffracted light from at least one diffractive nano-structure array from each of the plurality of micro-pixels.

In an example embodiment, the surface normals of the plurality of micro-facets of each micro-pixel differ in polar angle but are substantially parallel in azimuthal angle such that the polar angle of the viewing angle of diffracted light from each diffractive nano-structure is primarily determined by the polar angle of the micro-facet of the diffractive nano-structure array.

In an example embodiment, each micro-facet of each micro-pixel includes a first plurality of diffractive nano-structure arrays that are configured such that the azimuthal angle of the viewing angle of each of the first plurality of diffractive nano-structure arrays varies from the azimuthal angles of the viewing angles of the others of the first plurality of diffractive nano-structures.

In an example embodiment, each of the first plurality of diffractive nano-structure arrays include one or more blazed grating arrays, and the hue of the diffracted light is determined by a periodicity of each of the one or more blazed grating arrays, and the intensity is determined by an area of each of the one or more blazed gratings.

In an example embodiment, each of the first plurality of diffractive nano-structure arrays is about 300 nm or more in width, and each of the blazed grating arrays have a respective periodicity that is between about 300 nm and about 700 nm and a respective blaze angle of between about 200 and about 30°.

In an example embodiment, each of the first plurality of the diffractive nano-structure arrays comprise a plurality of blazed grating arrays that have substantially parallel viewing angles, blazed grating arrays associated with a diffractive nano-structure array are each associated with a respective colour and have a periodicity that corresponds to a wavelength of light of the associated colour and have an area that is associated with an intensity of the associated colour, such that the colours and intensities of the diffracted light from each of the plurality of blazed grating arrays combine to provide the hue and intensity of diffracted light from the diffractive nano-structure array associated with the plurality of blazed grating arrays.

In an example embodiment, each of the plurality of blazed grating arrays includes a red sub-pixel grating array having a periodicity of about 416 nm and a blaze angle of between about 20° and 30°, a green sub-pixel grating array having a periodicity of about 512 nm and a blaze angle of between about 20° and 30°, and a blue sub-pixel grating array having a periodicity of about 608 nm and a blaze angle of between about 20° and 30°.

In an example embodiment, an orientation the one or more blaze grating arrays of each of the first plurality of diffractive nano-structures are rotated about the normal of the micro-facet relative to an orientation of the one or more blaze grating arrays of the others of the first plurality of diffractive nano-structure to provide varying azimuthal angles of the diffracted light.

In an example embodiment, for each micro-pixel, the first plurality of diffractive nano-structure arrays in a particular micro-facet are configured such that the diffracted light from each of the first plurality of diffractive nano-structure arrays of the particular micro-facet have substantially the same hue and intensity.

In an example embodiment, for at least some of the micro-facets of at least some of the micro-pixels, the first plurality of diffractive nano-structure arrays are configured such that the diffracted light diffracted from the first plurality of diffractive nano-structure arrays varies in hue, or intensity, or in both hue and intensity compared to diffracted light diffracted from the first plurality of diffractive nano-structures of the other micro-facets of the micro-pixel such that different images are displayed at view zones differing in azimuthal angle but having substantially the same polar angle.

In an example embodiment, for each micro-pixel, each of the micro-facets of that micro-pixel include substantially the same set of the first plurality of diffractive nano-structure arrays such that substantially the same image is displayed at view zones having different polar angle but having substantially the same azimuthal angle.

In an example embodiment, for at least some of the micro-pixels, at least some of the first plurality of diffractive nano-structure arrays are configured such that the diffracted light diffracted from the first plurality of diffractive nano-structure arrays varies in hue, or intensity, or in both hue and intensity compared to diffracted light diffracted from the first plurality of diffractive nano-structures of the other micro-facets of the micro-pixel such that different images are displayed at different viewing zones along the same azimuthal angle.

In an example embodiment, the first plurality of diffractive nano-structures are configured such that the combination of polar and azimuthal angles of the diffracted light from each of the first plurality of diffractive nano-structures varies from the combination of polar and azimuthal angles of the others of the first plurality of diffractive nano-structures, such that different images are displayed at different viewing zones along any axis.

In an example embodiment, the surface normals of the plurality of micro-facets of each pixel differ in azimuthal angle and polar angle such that the polar component of the viewing angle of diffracted light from each diffractive nano-structure is determined primarily by the polar component of the angle of the surface normal of the micro-facet, and the azimuthal component of the viewing angle of the diffracted light is determined by the azimuthal component of the surface normal angle of the micro-facet and the azimuthal component of the fundamental order of diffraction of the diffractive nano-structure.

In an example embodiment, for each micro-pixel, the at least one diffractive nano-structure array of a particular micro-facet is configured such that the polar and azimuthal angles of the viewing angle of the diffracted light from the at least one diffractive nano-structure arrays varies from the polar and azimuthal angles of the at least one diffractive nano-structure array of others of micro-facets of the micro-pixel, such that the images are displayed at view zones that do not in a grid arrangement.

In an example embodiment, the micro-pixels have sides that are between about 20 μm and about 80 μm.

In an example embodiment, each micro-facet includes a plurality of micro-planes, each micro-plane including at most one of the plurality of diffractive nano-structures and having sides that are between about 300 nm and about 12 µm.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described.

Figure 1B:
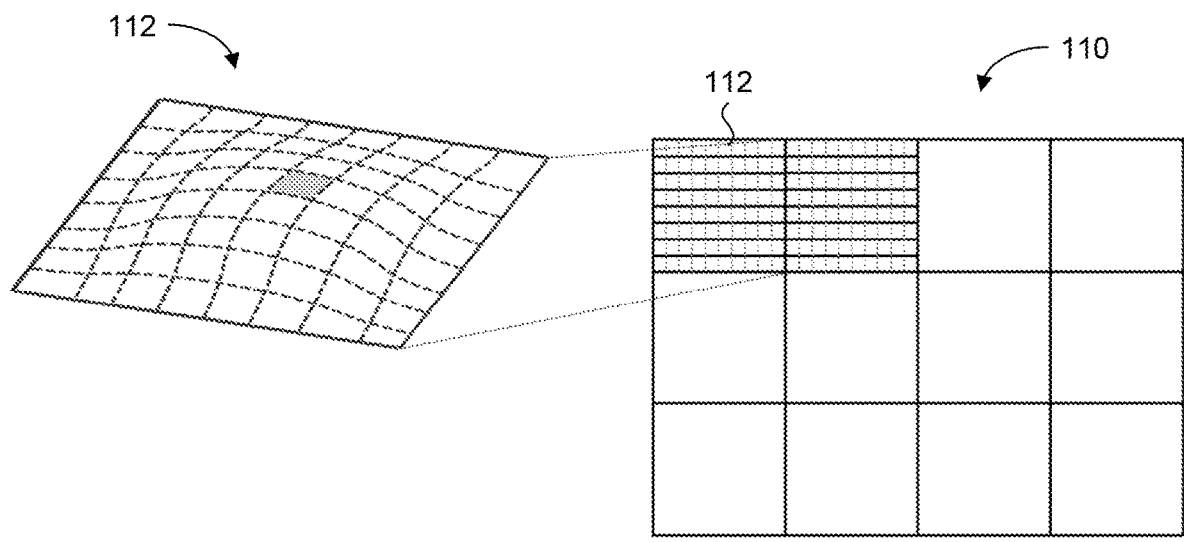

FIGS. 1A and 1B show two examples of diffractive displays 100, 110 that include a plurality of micro-pixels, each micro-pixel including a plurality of micro-facets according to specific embodiments of the present disclose.

In the present disclosure, the term "micro-pixel" is utilized to describe the smallest micro-scale building block of a diffractive display with addressable display coordinates. The display area is made by a periodic lattice of at least one type of micro-pixels. Each micro-pixel has a 3D surface formed by a plurality of "micro-facets". The normal vectors of the micro-facets are configured to reflect the incident light into a desired polar and azimuthal angle.

The example diffractive display 100 shown in FIG. 1A includes a plurality of micro-pixels 102, each micro-pixel 102 including, in the example shown in FIG. 1A, eight rectangular-shaped micro-facets 104a-104h (see enlarged inset in FIG. 1A) arranged around a cylindrical-shaped surface such that a surface normal of each of the micro-facets 104a-104h are non-parallel, varying in the polar angle component but having generally the same azimuthal angle components.

FIG. 1B shows an alternative embodiment of a diffractive display 110 in which each of the plurality of micro-pixels 112 includes sixty-four micro-facets arranged over a dome-shaped surface such that the surface normals of each of the micro-facets are non-parallel, varying in both azimuthal angle and polar angle components.

Although the example diffractive displays 100, 110 include twelve micro-pixels 102, 112, respectively, in practice a diffractive display may include many more than twelve micro-pixels. The physical size of a micro-pixel can be limited to suit the application, for example in relation with the human eye's resolution, which restricts the size and number of embedded micro-facets per unit area. Further, although the micro-pixels 102, 112 of the example diffractive displays 100, 110 are shown as squares, in other examples the micro-pixels may be any shape that is suitable for providing a regular lattice of micro-pixels 102, 112.

Further, although the micro-facets 104a-104h of the diffractive display 100 are arranged over a cylindrical surface and the micro-facets of the diffractive display 110 are arranged over a domed shaped surface, in practice any suitable surface may be utilized such that at least some of the micro-facets have surface normals that are non-parallel, including, for example, microcylinders, micro-pyramids, micro-domes, bi-facets, and quadra-facets.

Each of the micro-facets of a diffractive display functions as a micro-reflector that independently reflects an incident light beam toward different orientations in space due to the non-parallel surface normals of the micro-facets. Each micro-facet includes one or more diffractive nano-structure arrays that diffracts incident light beam into a specific azimuthal and polar angle in space, which is referred to herein as the viewing angle. In some examples, the diffractive nano-structure arrays may be blazed grating arrays.

The combination of a blazed grating nano-structure array overlaid on a micro-facet of a 3D micro-pixel may provide an efficient diffractive colour filter that diffracts the incident light beam into a specific diffraction channel having a polar angle and an azimuthal angle determined by the grating's periodicity, grating's azimuthal angle, as well as the micro-facet's polar and azimuthal angles.

In some embodiments, each micro-facet may include one or more sets of diffractive nano-structure arrays, each set independently displaying a unique colour identified with a hue, a saturation, and a luminance value. The values of hue, saturation and luminance are determined by the size and periodicity of each of diffractive nano-structure arrays along with the spectrum of the incident light, or the backlight if the diffractive display is backlit.

In an example, a colour pixel may be comprised of three diffractive nano-structure arrays, each of which may be referred to herein as a "sub-pixel". For example, the three sub-pixels of a set may be configured to diffract wavelengths of red, green and blue coloured light, respectively. The area of each sub-pixel may be adjusted to control the optical power of each associated colour component, as well as the total optical power of the colour pixel such that the combined diffracted light component from each sub-pixel provides the intrinsic hue, saturation, and luminance values of the colour pixel.

Figure 2:
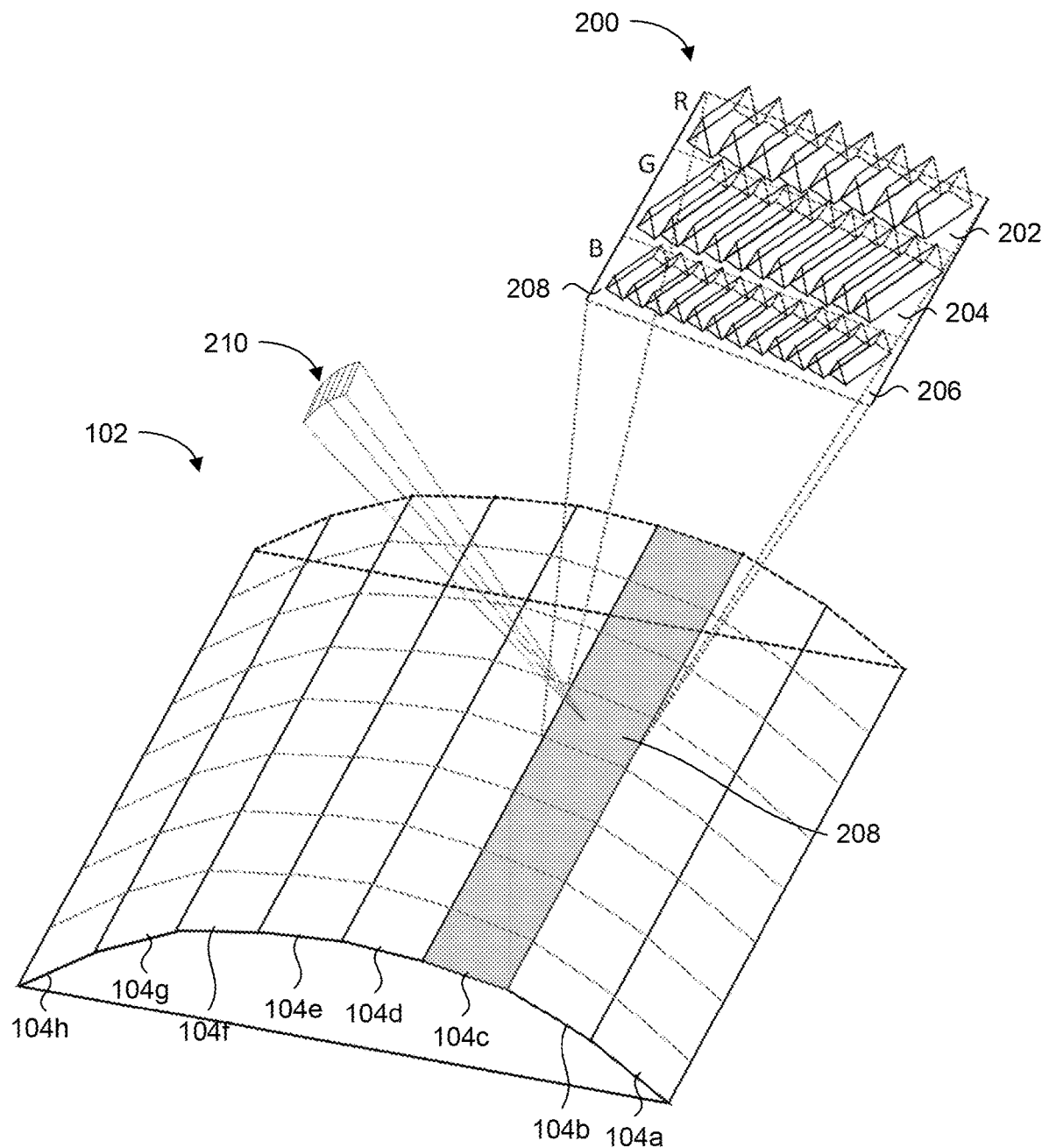
FIG. 2 shows an example micro-pixel according to the embodiment shown in FIG. 1A.

FIG. 2 shows the example micro-pixel 102 from FIG. 1A in which the diffractive nano-structure arrays are colour pixels. In FIG. 2, a colour pixel 200 located on micro-facet 104c is shown enlarged. The colour pixel 200 comprises three diffractive nano-structure arrays, or sub-pixels: a first array 202, which is configured to diffract red (R) light, a second array 204 configured to diffract green (G) light, and a third array 206 configured to diffract blue (B) light. In the example shown in FIG. 2, the diffractive nano-structure arrays 202 to 206 are blazed grating arrays, however in other examples the diffractive nano-structure arrays may be any suitable type of diffractive nano-structure arrays.

In the example shown in FIG. 2, the blaze grating array of the first array 202 configured to diffract red light may have a periodicity of about 416 nm and a blaze angle of about 200 to about 30°, the blaze grating array of the second array 204 configured to diffract green light may have a periodicity of about 512 nm and a blaze angle of about 20° to about 30°, and the blaze grating array of the third array 206 configured to diffract blue light may have a periodicity of about 608 nm and a blaze angle of about 20° to about 30°.

In general, depending on the colour desired and any fine tuning to the desired direction of the fundamental order of diffraction, the periodicity of each blaze grating array of each sub-pixel may be between about 300 nm and about 700 nm.

The portion of a micro-facet that includes a single set of diffractive nano-structure arrays may be referred to as a "micro-plane". In FIG. 2, the example colour pixel 200 is provided on micro-plane 208 of the micro-facet 104c.

In the example micro-pixel 102, each micro-facet 104a-104h includes eight micro-planes, shown separated by dashed lines in FIGS. 1A and 2, meaning that each micro-facet 104a-104h of the example micro-pixel 102 may include up to eight diffractive nano-structure arrays or colour pixels.

Although each of the micro-facets of the example micro-pixel 102 includes eight micro-planes, in practice, a micro-facet may include more or less than eight micro-planes, with the number of micro-planes constrained by the physical size requirements of providing a diffractive nano-structure array, or a set of diffractive nano-structure arrays, on each microplane. For example, in the micro-pixel 110 shown in FIG. 1B, each micro-facet includes a single micro-plane.

In practice, the physical size of a micro-pixel may be limited based on the application of the diffractive display. In an example, the physical size of a micro-pixel may be limited based on, for example, the human eye's resolution. The physical limitations on the size of the micro-pixel may then limit the size and number of embedded micro-facets per unit area. In an example, the micro-pixels may have widths that are between about 20 μm and about 80 μm. The size of each micro-facet may depend on the number of diffractive nano-structure arrays, or number of micro-planes, are included on each micro-facet. Typically, for colour pixels, each diffractive nano-structure array may be between about 300 nm and about 12 μm, with each of the sub-pixels being between about 300 nm and about 12 μm. For example, in cases in which the diffractive nano-structure array includes only a single array, such as for example if the diffractive display having mono-colour image, each diffractive nano-structure array may have a width that is about 300 nm or more, or a length that is about 300 nm or more, or both a width and a length that are each about 300 nm or more.

Each diffractive nano-structure arrays of the micro-pixel 102 is configured to diffract light at a particular viewing angle. For a given angle of incident light, the viewing angle a particular diffractive nano-structure array will be determined based on the surface normal of the micro-facet on which the diffractive nano-structure array is provided and the azimuthal angle and polar angle of the fundamental order of diffraction of the diffractive nano-structure array. The viewing angle determines the "view zone" for the diffractive nano-structure array. The example colour pixel 200 shown in FIG. 2 has a view zone 210. "View zone" refers to the spatial zone surrounding the diffractive display in which the diffractive nano-structure array delivers the highest visibility of diffracted light. In the example of a blazed grating, the view zone is determined by the fundamental diffraction order.

Each diffractive-nano-structure array may be configured to diffract light in a viewing angle that corresponds to a unique view zone. As set out above, the 3D structured micro-pixels of a diffractive display according to the present embodiment, provides additional degrees of freedom to control the viewing angles of the diffractive nano-structure arrays on the micro-pixel. For example, the angular variations of the surface normal of the micro-facets of a micro-pixel, such as micro-facets 104a-104h of micro-pixel 102, facilitate variations in viewing angles than would be obtainable by diffractive nano-structure arrays provided on the same plane.

In the example of a colour pixel, each of the set of sub-pixels, for example the sub-pixels 202 to 206 in the colour pixel 200 shown in FIG. 2, will have parallel viewing angles in order to provide the desired hue, saturation, and luminance values of the diffracted light when viewed in the view zone.

Figure 3:
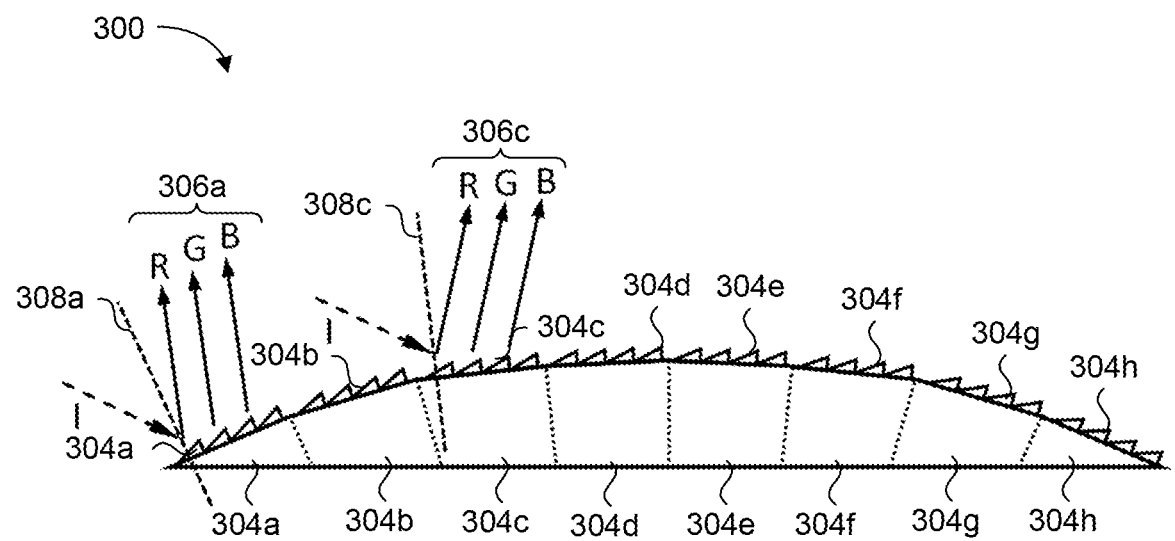
FIG. 3 shows cross sectional view of an example micro-pixel according to another embodiment of the present disclosure.

FIG. 3 provides a cross-sectional view of an example micro-pixel 300 having a convex cross-section. The example micro-pixel 300 may be similar to, for example, the example micro-pixel 102 described previously. The micro-pixel 300 includes eight micro-facets 302a-302h, each having a colour pixel 304a-304h. In FIG. 3, the diffracted light 306a and 306c of the fundamental diffractive order of the colour pixels 304a and 304c when a planewave of incident light, indicated by the arrow labelled "I", is shone on the micro-pixel 300 is shown. The diffracted light 306a and 306c of each colour pixel 304a and 304c includes the separate components, illustrated by the arrows R, G, B in FIG. 3, which diffract from the separate sub-pixels (not shown). The colour hue and saturation of the diffracted light 306a and 306c is the combination of colour hue and saturation values provided by each of the R, G, B components. The combination of the diffracted light 306a and 306c may be, for example, a linear combination of the colour hue and saturation values provided by each of the R, G, B components.

As shown in FIG. 3, the R, G, B components are parallel for each of the diffracted light 306a and 306c. For a given planewave of incident light, the viewing angle of the diffracted light 306a and 306c is a function of the surface normal 308a and 308c of the micro-facets 302a and 302c, respectively, as well as the fundamental diffractive order of the colour pixels 304a and 304c.

In the case in which the colour pixels 308a and 308c are formed by individual blazed gratings, such as the sub-pixels 202 to 206 shown in FIG. 2, alignment of the R, G, B components may be provided by adjusting the periodicity of the blazed grating of each sub-pixel such that the fundamental diffraction orders of the sub-pixel are parallel.

In order to form an image, each of the micro-pixels, or at least some of the micro-pixels, of the diffractive display will have at least one diffractive nano-structure array configured with a viewing angle that corresponds with a respective one of these unique view zones. In this way, when a viewer is viewing the diffractive display in a particular view zone, the diffracted light from the diffractive nano-structures arrays of the micro-pixels that are configured to diffract light at a viewing angle corresponding to the view zone will form an image.

The images viewable at each view zone may be the same or may be different, or some combination of same and different pictures.

For example, at least some of the images viewable at different view zones may be the same in order to increase the effective view zone over which the image is viewable by a viewer. This may mitigate an issue with conventional diffractive displays that the image is viewable only at a narrow view zone, thus increasing the viewability of the diffractive display compared to conventional diffractive displays.

Additionally, or alternatively, at least some of the images viewable at different view zones may be different such that, as the diffractive display moves relative to a viewer's eye, the viewer perceives an animated image. The animation may be utilized to provide a parallax effect, either along a single axis, or two axes, or along arbitrary axes, as described in more detail below, such that the image appears to have depth. The different images in different view zones may be utilized to provide a stereoscopic image to the viewer in order to create a 3D effect by presenting slightly different views of an object at different view zones that are distanced apart by an amount that approximates the distance between a viewer's eyes.

In another example, the animation may be utilized to provide the effect of movement of an object as the viewer's eye moves through the different view zones.

In some examples, the images may be combination of the same images at some view zones and different images at other view zones. For example, the same image may be presented at a number of view zones that are clustered together to provide an increased view zone for that image, whereas another image is presented at a number of different view zones that are clustered, in order to provide both increased view zone size and animation.

Figure 4:
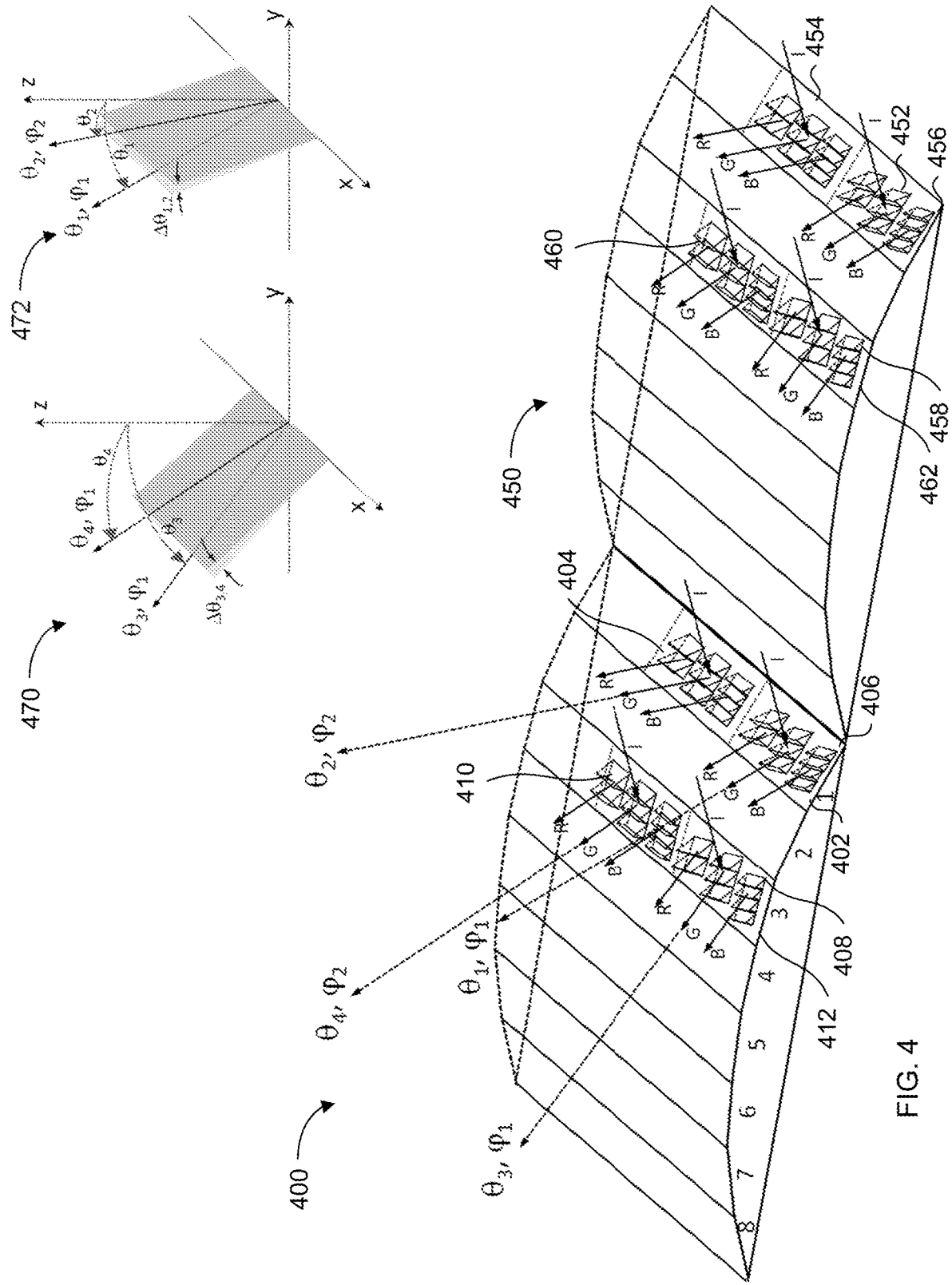
FIG. 4 shows an example of two micro-pixels according to another embodiment of the present disclosure.

Referring now to FIG. 4, two micro-pixels 400, 450 are shown. The micro-pixels 400, 450 each include eight micro-facets and may be substantially similar to the example micro-pixel 102 described previously.

Each micro-facet of the micro-pixels 400, 450 embeds a certain number of colour pixels. In the examples shown in FIG. 4, the colour pixels each populated with a plurality of diffractive blazed grating nanostructures.

FIG. 4 shows four exemplar colour pixels on micro-pixel 400: colour pixels 402 and 404 on a first micro-facet 406, and colour pixels 408 and 410 on a second micro-facet 412. Similarly, FIG. 4 shows four exemplar colour pixels on micro-pixel 450: colour pixels 452 and 454 on a first micro-pixel 456, and colour pixels 458 and 460 on a second micro-pixel 462.

Each of the colour pixels 402, 404, 408, 410, 452, 454, 458, 460 contain red, green, and blue sub-pixels comprised of arrays of blazed grating arrays. Similar to the above description with reference to FIG. 3, the periodicities of red, green, and blue gratings of the colour pixels 402, 404, 408, 410, 452, 454, 458, 460 are configured to align their corresponding fundamental diffraction order, as illustrated by the R, B, G arrows shown in FIG. 4.

In the example shown in FIG. 4, the azimuthal angles of blazed gratings comprising the colour pixels 402 and 408 are substantially the same, and the azimuthal angles of the blazed gratings comprising the colour pixels 404 and 410 are also substantially the same. The azimuthal angles of the blazed grating arrays, as referred to in the present disclosure, refer to the orientation of the blazed gratings in the plane of the micro-facet on which the blazed grating is provide. For example, changing the azimuthal angle of the orientation of a blazed grating array is provided by rotating the orientation of the blazed grating array about the surface normal of the micro-facet on which the blazed grating array is provided.

In the example shown in FIG. 4, the fundamental diffraction orders of colour pixels 402, 404, 408, 410 are oriented along $(\theta_1,\varphi_1)$, $(\theta_2,\varphi_2)$, $(\theta_3,\varphi_1)$ and $(\theta_4,\varphi_2)$ polar and azimuthal angles, respectively. In the example shown, $\Delta\theta_{1,2}=\theta_2-\theta_1\ll\theta_3-\theta_1$ and $\Delta\theta_{3,4}=\theta_4-\theta_3\ll\theta_4-\theta_2$, as illustrated in insets 470, 472.

In the example shown in FIG. 4, the micro-pixels 400 and 450 have substantially similar 3D shape, and the fundamental diffraction order of the colour pixels 452, 454, 458, 460 of the micro-pixel 450 substantially correspond to the fundamental diffraction order of colour pixels 402, 404, 408, respectively. In this manner, a first image that includes the light diffracted from colour pixels 402 and 452 is viewable at a view zone corresponding to $(\theta_1,\varphi_1)$, a second image that includes the light diffracted from colour pixels 404, 454 is viewable at a view zone corresponding to $(\theta_2,\varphi_2)$, a third image that includes the light diffracted from colour pixels 408, 458 is viewable at a view zone corresponding to $(\theta_3,\varphi_1)$, and a fourth image that includes the light diffracted from colour pixels 410, 460 is viewable at a view zone corresponding to $(\theta_4,\varphi_2)$. As described above, the first, second, third, fourth image may all be the same image or all may be different images, or some combination thereof.

Although having micro-pixels and their component diffractive nano-structure arrays that substantially spatially correspond to one another, such as the pixels 400 and 450 shown in FIG. 4, in other embodiments, micro-pixels of a diffractive display may differ from one another, either in 3D structure of the micro-pixel, or in the layout of corresponding diffractive nano-structure arrays. However, micro-pixels that are spatially similar in that, for example, the micro-pixels have similar 3D shape and have diffractive nano-structures arrays that correspond to the same image located in approximately the same location on the micro-pixel, may result in simplified design and manufacture of the diffractive display compared to diffractive displays in which the micro-pixels are not spatially similar.

As illustrated in the example shown in FIG. 4, the polar angles, θ, of light beams diffracted from colour pixels within a single micro-facet are only slightly changed as a result of blazed grating in-plane rotation, as shown in each of the insets 470 and 472. However, the polar angles, θ, of diffracted light beams placed on distinctly oriented micro-facets can be substantially different, as shown when comparing the polar angles, θ, in inset 470 with those of inset 472.

In this manner, rotating the orientation of the blazed grating arrays of the colour pixels of a micro-facet about the surface normal may be utilized to create view zones of colour pixels placed inside the same micro-facet, such as colour pixels 402 and 404 of micro-facet 406 or colour pixels 408 and 410 of micro-facet 412, being approximately aligned in polar angle, θ, while differing in azimuthal angle, T.

The in-plane azimuthal angle, $\phi$, of the orientation of the blazed grating array determines the out-of-plane azimuthal angle, T, and polar angle, θ, of the fundamental diffraction order and thus the view zone of the overall colour pixel. Incremental rotation of the in-plane azimuthal angle within a certain angular range ($-45°\leq\phi\leq45°$) allows the fundamental order to sweep over a certain range of out-of-plane azimuthal angles $\varphi$ and a narrow range of out-of-plane polar angles $\theta$.

As described below with reference to FIGS. 5-8, the in-plan rotation of the diffractive nano-structure arrays can be selected between micro-facets in order to provide one-axis parallax, two-axis parallax, or full parallax.

Figure 5:
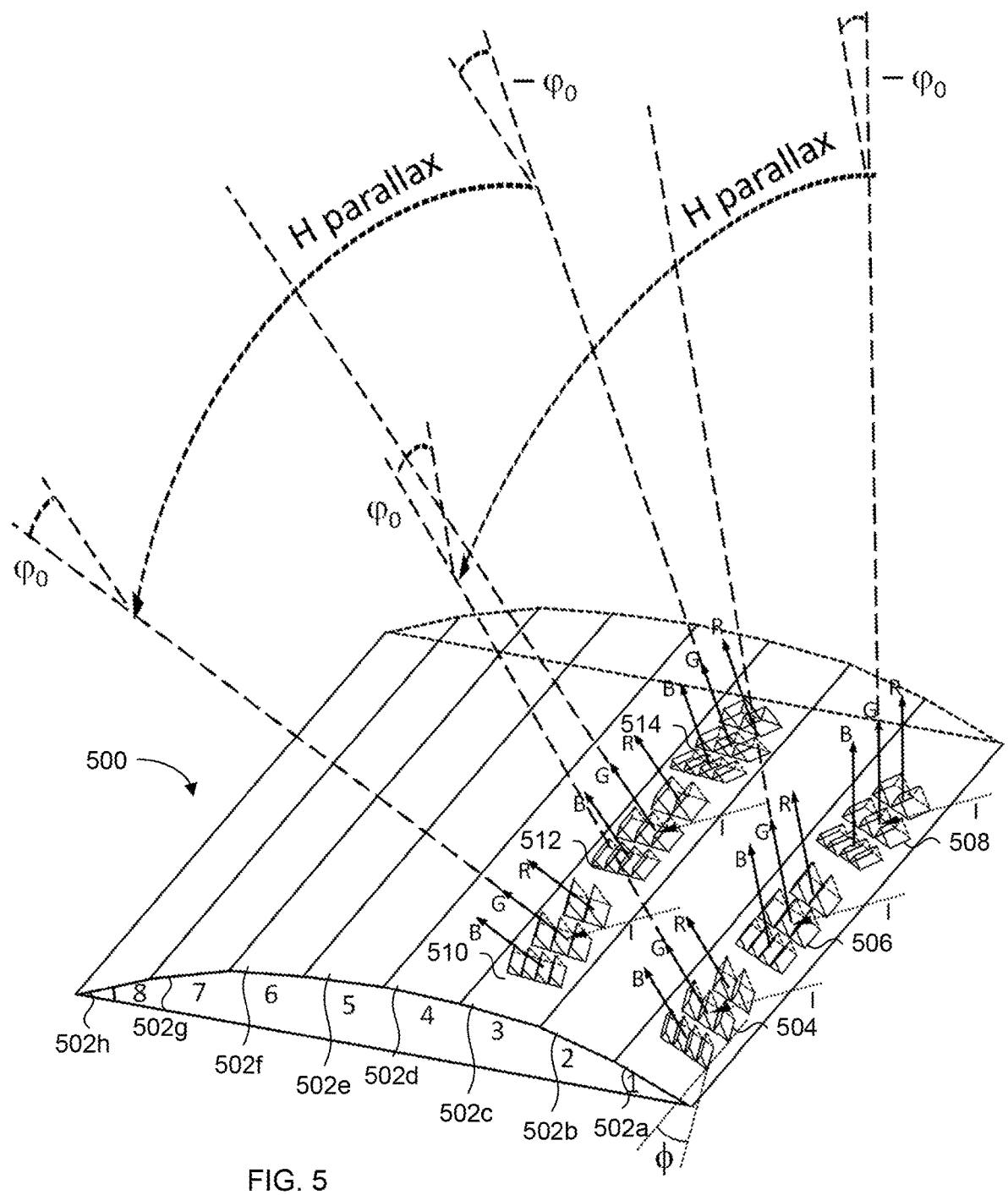
FIG. 5 shows an example micro-pixel according to another embodiment of the present disclosure.

FIG. 5 shows an example micro-pixel 500 with a 3D surface profile composed of eight symmetrically angled micro-facets 502a-502h, each micro-facet embeds a number of colour pixels populated with differently oriented diffractive nano-structure gratings. In FIG. 5, three exemplar colour pixels 504, 506, and 508 embedded on micro-facet 502a, and three exemplar colour pixels 510, 512, 514 embedded on micro-facet 502c, are shown, which each of the colour pixels 504, 506, 508, 510, 512, 514 comprising three sub-pixels.

The in-plane azimuthal angles of the blazed grating arrays of the colour pixels of each micro-facet 502a-502h may be rotated by a predetermined increment, $\Delta\phi$. The increment may be, for example, selected from the $0.5°\leq\Delta\phi\leq45°$. The incremental in-plane rotation of gratings of the colour pixels of a micro-pixel 502a-502h may produce a single-axis parallax at a unique out-of-plane polar angle corresponding to that micro-facet 502a-502h. This single-axis parallax may be referred to herein as horizontal parallax, or H parallax.

A finite number of distinguishable polar angles of the view zones of the diffractive display enabled by the finite number of distinctly angled micro-facets facilitates a wider, or multiple, view zone(s) and at least one additional parallax axis as described below.

Figure 6:
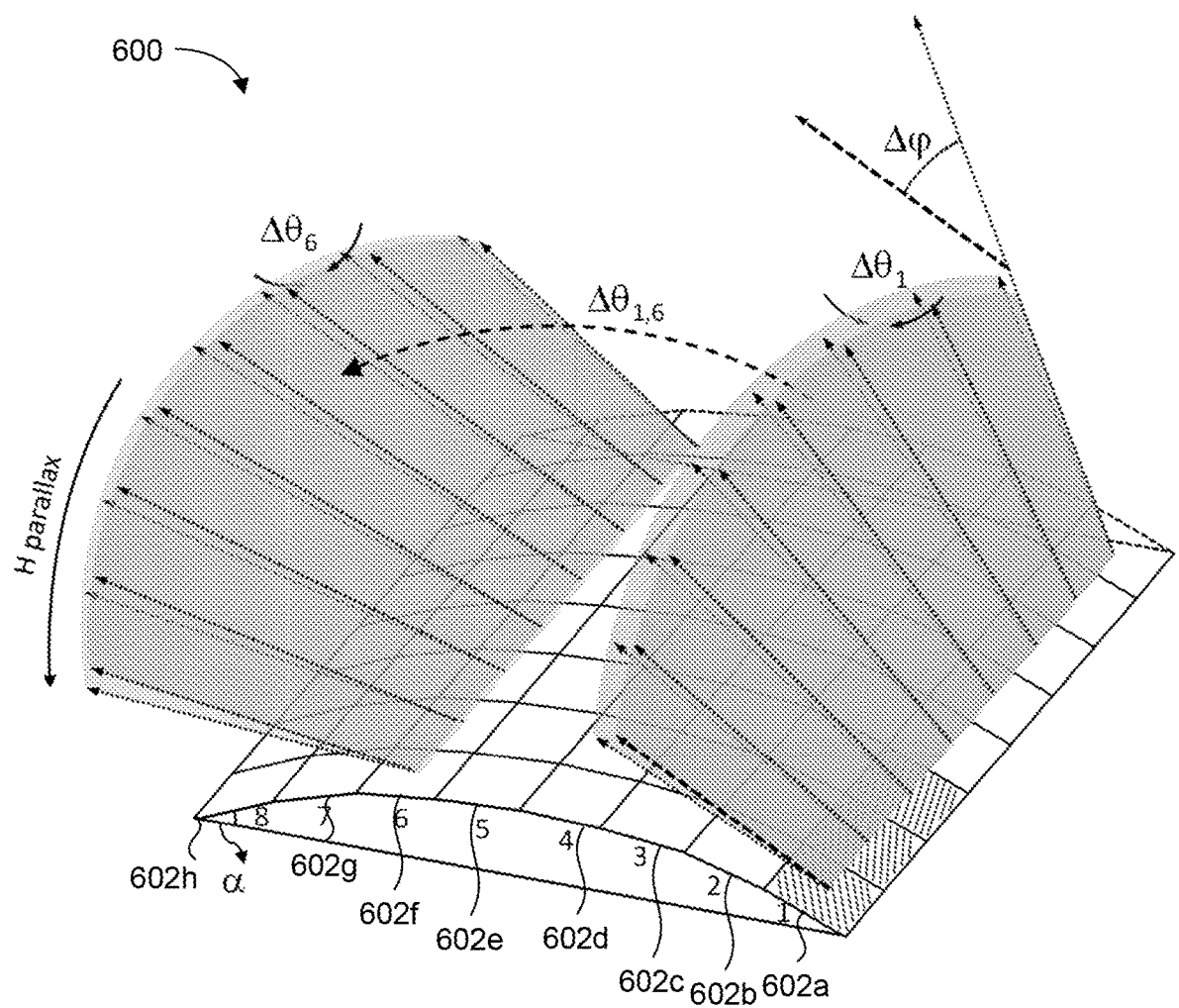
FIG. 6 shows an example micro-pixel according to another embodiment of the present disclosure.

FIG. 6 shows an example micro-pixel 600 having eight micro-facets 602a-602h that are incrementally angled, similar the micro-facets 102a-102h previously described. Each micro-facet 602a-602h of the example micro-pixel 600 in eight colour pixels that are incrementally rotated diffractive gratings. The set of eight colour pixels of each of the micro-facets 602a-602h enable eight images spread over a relatively wide span of horizontal view zones, $\Delta\varphi$, compared to the relatively narrow vertical view zone $\Delta\theta_1$, such that $\Delta\theta_1 \ll \Delta\phi$. An incremental change of the micro-facet angle, $\alpha$, increases the viewability of the images by diffracting the diffracted light-beam at viewing angles that span a relative wide range of polar angles compared the vertical view zone of the diffractive nano-structure arrays of a single micro-facet. For example, the arrows in FIG. 6 shows the viewing angles of the diffracted light beams from the sets of the diffractive nano-structure arrays of micro-facets 602a and 602f. As shown in FIG. 6, the difference in polar angle of the viewing angles from the diffractive nano-structure arrays of micro-facets 602a and 602f, $\Delta\theta_{1,6}$, is much larger than the span of polar angles of the viewing angles of the diffractive nano-structure arrays of a single one of the micro-facets 602a or 602f, $\Delta\theta_1$ or $\Delta\theta_6$, such that $\Delta\theta_1$, $\Delta\theta_6 \ll \Delta\theta_{1,6}$.

In an embodiment in which the same set of colour pixels, are repeated on each of the micro-facets 602a-602h, for each micro-pixel of the diffractive display, will provide a wide view zone of the same horizontal-only-parallax animation. In this example, up to eight different perspectives or frames of animation can be provided, for each of the eight different nano-structure arrays provided on each micro-pixel, with the same eight perspectives or frames being viewable over the large range of polar angles, $\Delta\theta_{1,8}$, by repeating the same sets of nano-structure arrays on each of the micro-facets 6021a-602h of a micro-pixel.

Alternatively, each angled micro-facet 602a-602h may include a unique set of colour pixels comprising incrementally rotated diffractive gratings. Each micro-facet 602a-602h may then displays a horizontal-only-parallax animation, and a distinct animation may be displayed to the viewer when moving between view zones of differing polar angle because the viewer is viewing images originating from the diffractive nano-structure arrays of different micro-facet 602a-602h. In this example, the multiple polar angles provided by the angled micro-facets 602a-602h provide an additional degree of freedom and facilitate vertical parallax, as described in more detail below with reference to FIG. 6, or full parallax as described in more detail below with reference to FIG. 8, depending on the azimuthal angle of diffractive gratings in the colour pixels.

With two-axis parallax, a distinct image or animation may be displayed within view zones that differ in polar angle, i.e. that are on different horizontal planes that each correspond to a micro-facet. As an example, FIG. 7 shows an example micro-pixel 700 that includes four micro-facets 702a-702d, which may be referred to as a quadra-facet micro-pixel.

Figure 7:
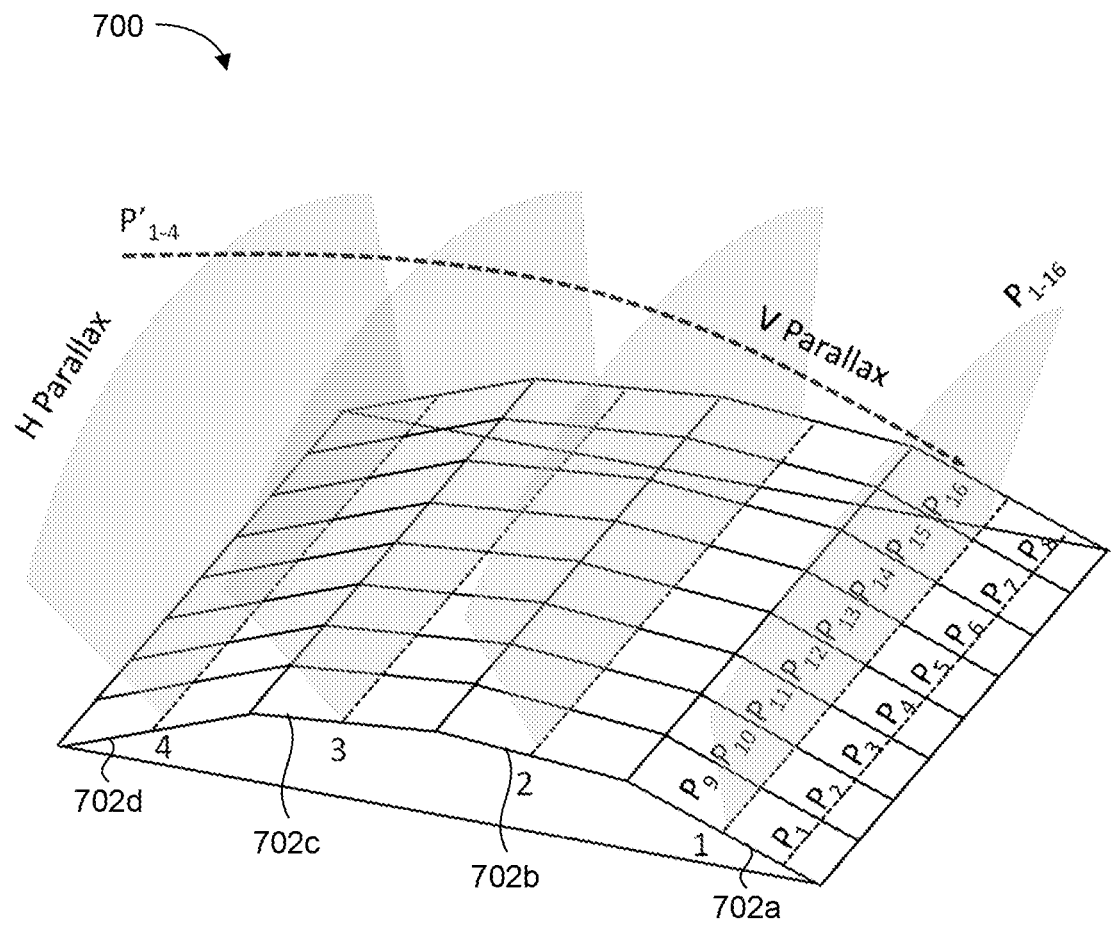
FIG. 7 shows an example micro-pixel according to another embodiment of the present disclosure.

The first micro-facet 702a in the example shown in FIG. 7 hosts 16 diffractive colour pixels, $P_1$ to $P_{16}$, comprising gratings that are incrementally rotated relative to one another, as described previously, such that 16 frames of an animation, or 16 azimuthal perspectives of a light field, are displayed in sequence when the viewer moves along the azimuthal plane, shown as the shaded planes in FIG. 7. Each of the other micro-facets 702b-702d may include a unique set of 16 diffractive colour pixels displaying images related to a different polar perspective at view zones having a different polar angle compared to the view zones of colour pixels $P_1$ to $P_{16}$. of the first micro-facet 702a. Here, the azimuthal angles of the viewing angles of the diffractive light from the set of diffractive nano-structure arrays of each micro-facet 702a-702d match, but the combination of the colour hue, saturation, and luminance of the diffracted light may vary in the sets of colour pixels between micro-facets 702a-702d to provide the different images in different view zones.

In this example, the viewer can observe 16-frames animations of a moving 3D object, or 16 azimuthal perspectives of a 3D light field, at four different polar perspectives to provide what is referred to herein as two-axis, or biaxial, parallax.

Figure 8:
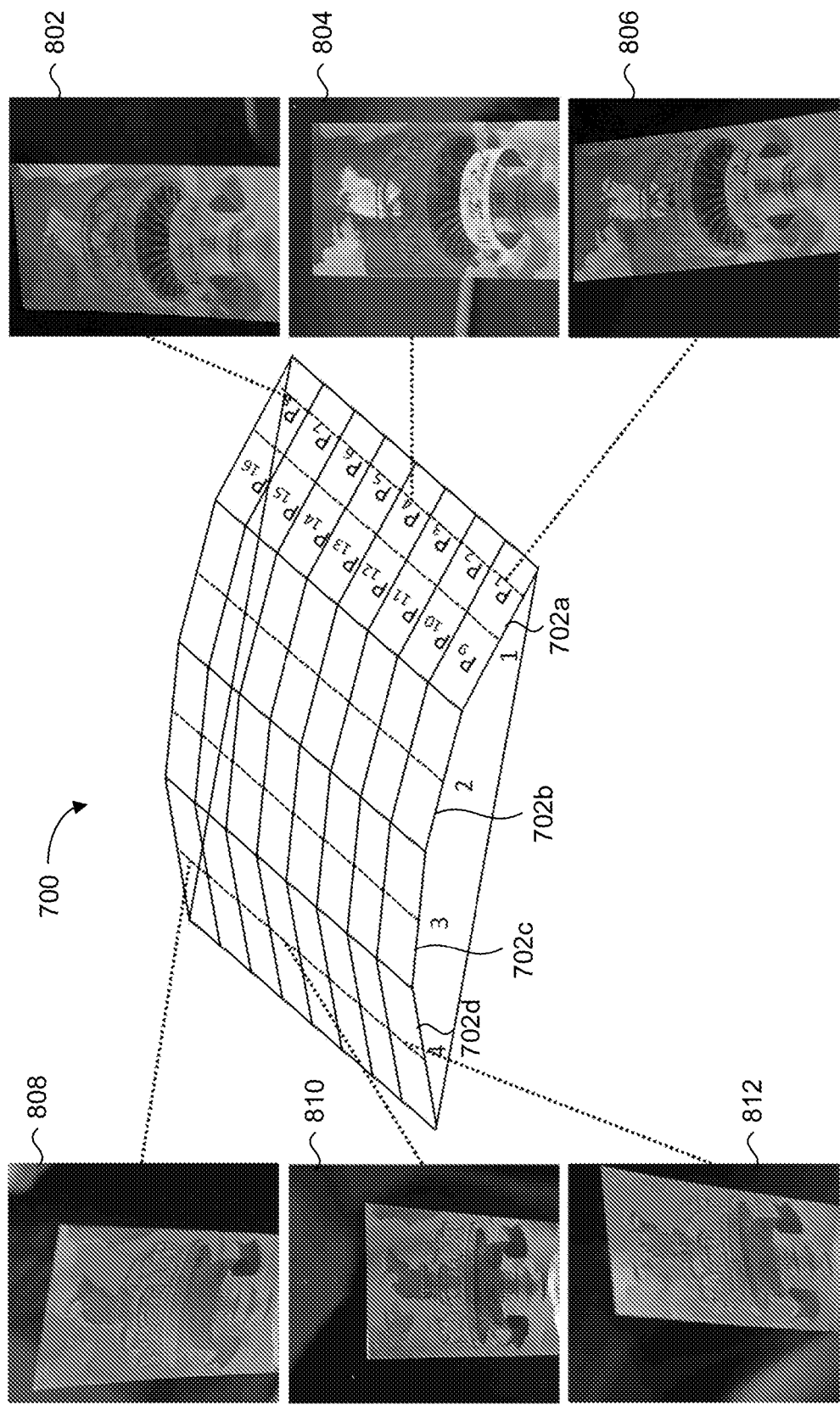
FIG. 8 shows example images viewable at different view zones from a diffractive display including micro-pixels according to the embodiment of FIG. 7.

FIG. 8 shows an example of photographs of the images of a torch that a viewer may view when viewing a diffractive display that includes the micro-pixel 700 as described with reference to FIG. 7. In this example, a torch was graphically designed and then rendered at sixty four different perspective images, which each of the sixty four diffractive nano-structure arrays of each micro-pixels being associated with a respective one of the 64 different perspective images. In photographs 802 to 806, the optical beams diffracted from three colour pixels in facet 702a were captured by the camera as the azimuthal angle of the camera relative to the diffractive display was varied, and in photographs 808 to 812, the optical beams diffracted from three colour pixels in facet 702d were captured by the camera as the azimuthal angle of the camera relative to the diffractive display was varied.

Alternatively, rather than repeating the same set of the azimuthal angles of the viewing angles of the diffracted light for each micro-facet, varying the set of azimuthal angles of the viewing angles of diffracted light, may be utilized to produce a full parallax light field capable of displaying multi-axis perspectives. In this case, the displayed 3D mode must be rendered at the same polar and azimuthal angles produced by the diffractive colour pixels sitting on different micro-facets of a micro-pixel.

Figure 9:
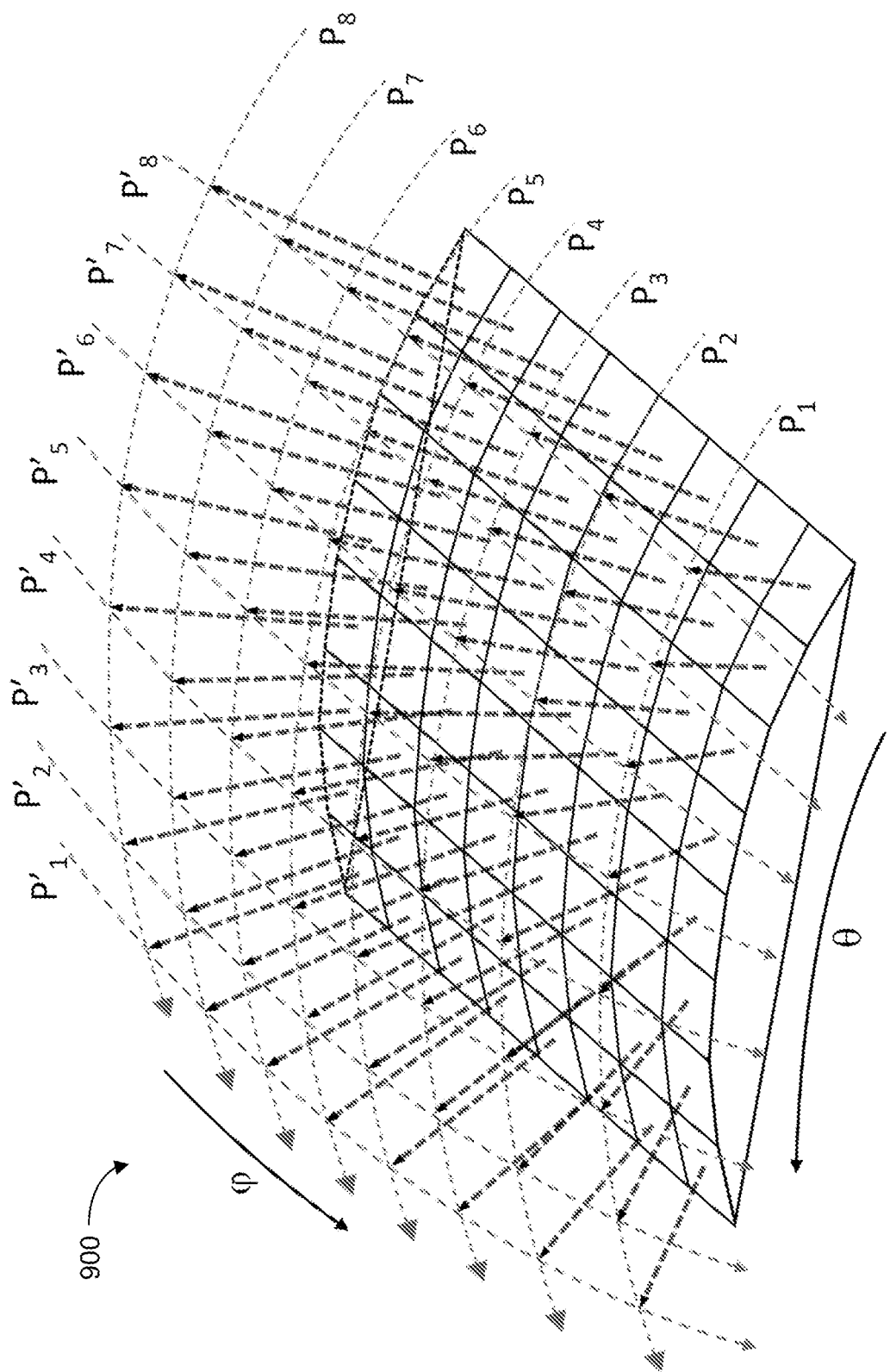
FIG. 9 shows an example micro-pixel according to another embodiment of the present disclosure.

In an example, FIG. 9 shows an example micro-pixel 900 that includes eight micro-facets, similar to the micro-facets 104a-104h of the example micro-pixel 102 previously described with reference to FIG. 1. Each micro-facet of the micro-pixel 900 hosts eight diffractive colour pixels, and the azimuthal angle of the constructing gratings changes incrementally in such a way that eight azimuthal perspectives of a 3D light field are displayed in sequence when the viewer moves along one of the polar planes $P'_1$ to $P'_8$, and eight polar perspectives of a 3D light field are displayed in sequence when the viewer moves along one of the azimuthal planes $P_1$ to $P_8$.

In the embodiment shown in FIG. 9, the sets of azimuthal angles of the diffractive colour pixels differ from micro-facet to micro-facet such that, rather than parallax that is bi-axial, as shown in the example embodiment in FIG. 8, parallax may be provided on a 3D light field that is not constrained to, for example, polar and azimuthal planes, but rather may provide images that shift in perspective in by moving between viewing angles in any desired direction. In this way, rather than the different images being viewable in viewing zones located in a gird-like arrangement, for example, as shown in FIG. 8, the viewing zones of the diffractive display shown in FIG. 9 may be arranged arbitrarily.

In another example, providing a 3D light field may be provided by a diffractive display in which the micro-pixels have micro-facets with surface normals that vary in both polar and azimuthal angles, rather than just polar angles as in the examples described previously. For example, the micro-pixel may have a domed shape similar to the micro-pixel 112 shown in FIG. 1B. In these examples, the viewing angles of the light diffracted from the diffractive nano-structure arrays will have polar angle components primarily controlled by the polar angle of the micro-facet's surface normal, but the azimuthal angle in this example will be determined by the fundamental diffraction order of the diffractive nano-structure array and the azimuthal angle of the surface normal of the micro-facet. As with the previously described examples, the images at these different view zones may be the same, in order to increase the viewable area of that image, or may be different in order to provide visual effects such as viewing different perspectives of a 3D object or animation, or some combination of increased viewable area and animated effects.

Figure 10:
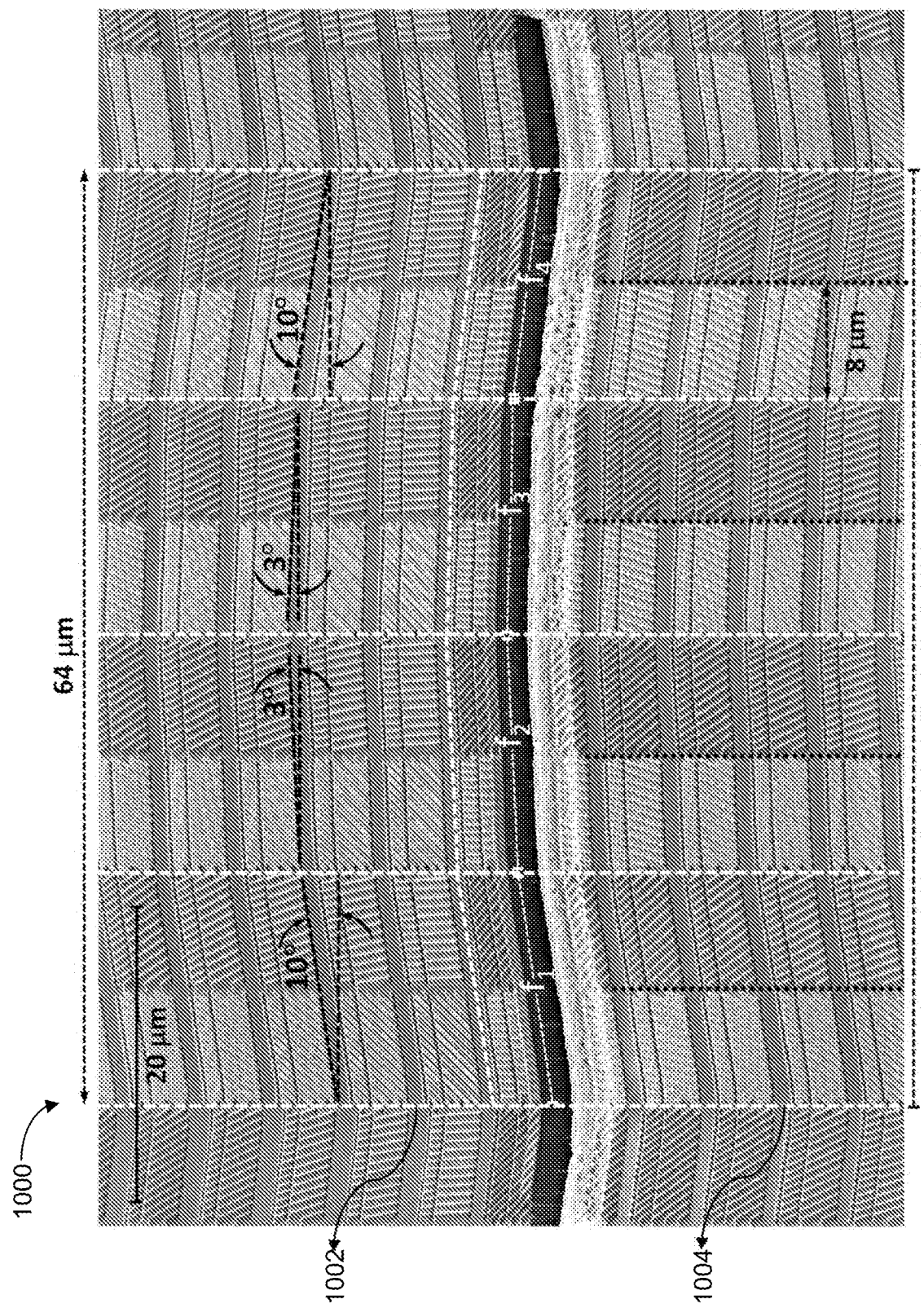
FIG. 10 shows an scanning electron microscope image of an example micro-pixel according to the embodiment shown in FIG. 7.

FIG. 10 shows a scanning electron microscopy (SEM) image 1000 of a fabricated diffractive device in accordance with the present disclosure. The device shown in image 1000 includes portions of two micro-pixels 1002, 1004 that are shown outlined by dashed lines. The diffractive device shown in image 1000 was designed based on the example presented in FIG. 7, where blazed grating nanostructures are overlaid on periodic quadra-facet microstructures. To show the tilted micro-facets $f_1$ to $f_4$, the cross-section of one quadra-facet is deep cut and polished using focused ion beam (FIB). In this example, each micro-pixel is 64 microns wide and embeds 64 colour pixels that are each 8 microns wide. The micro-facets are symmetrically tilted 3 and 10 degrees. Each facet contains 16 colour pixels, each displaying a frame at a distinct viewing angle. Equivalently, arrays of red, green, and blue blazed gratings are mapped with 16 linearly varying polar angles within each facet. Each micro-pixel can thus display 16 horizontal (azimuthal) perspectives and four vertical perspectives of a light field at 64 different angles.

Figure 11:
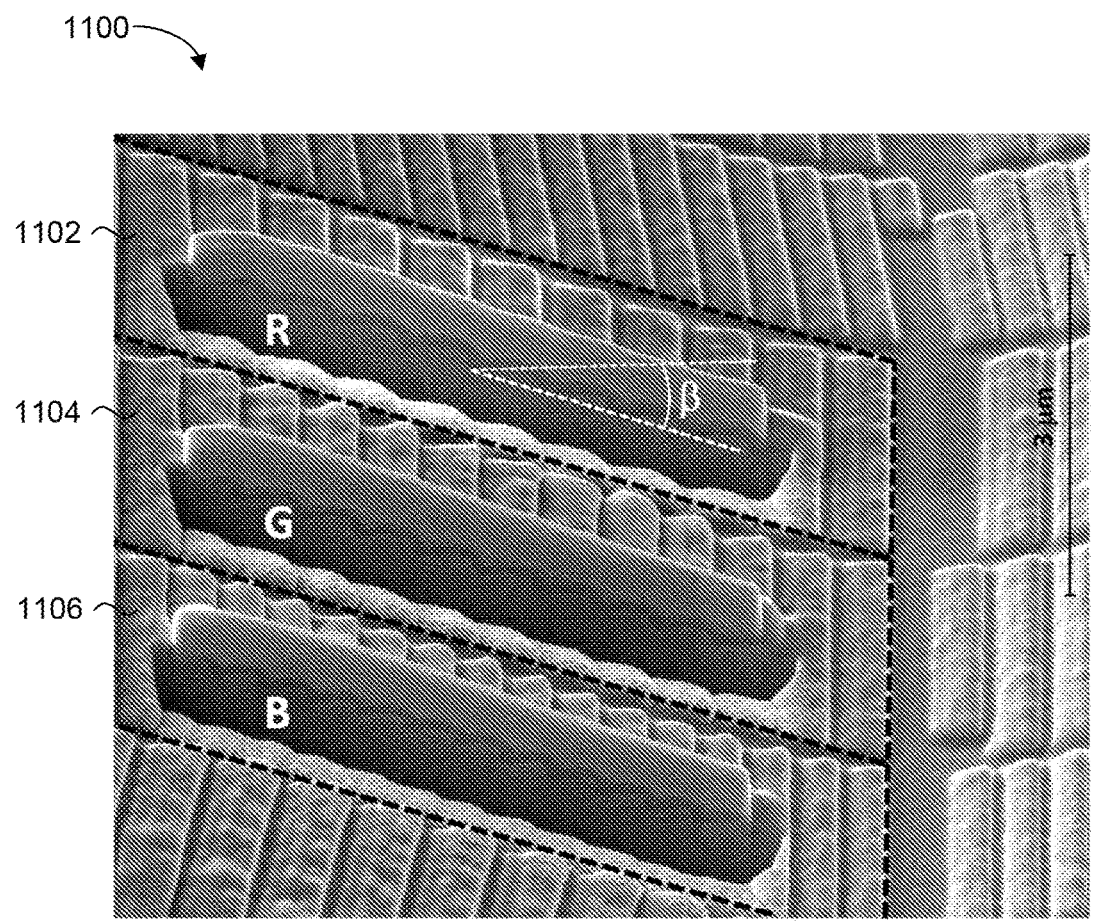
FIG. 11 shows a scanning electron microscope image of an example diffractive nano-structure array comprised of three sets of blazed grating arrays forming a colour pixel according to an embodiment of the present disclosure.

FIG. 11 shows an SEM image 1100 of a red (R) sub-pixel 1102, a green (G) sub-pixel 1104, and a blue (B) sub-pixel 1106 positioned in a colour pixel. Each of the sub-pixels 1102-1106 shown in the SEM image 1100 is cut using focused ion beam has been covered employing in-situ deposited platinum to achieve high image contrast during SEM image acquisition.

Each of the sub-pixels 1102-1106 includes a blazed grating array. To approximately align the viewing angles of the fundamental diffraction orders of each sub-pixel 1102-1106, the periodicities of blazed grating arrays for the R sub-pixel 1102, the G sub-pixel 1104, and the B sub-pixel 1106 in the example shown in FIG. 11 are set at 608 nm, 512 nm, and 416 nm, respectively to provide the desired combination of hue, saturation, and luminance at a desired polar and azimuthal angle.

Each of the R, G, and B sub-pixels 1102-1106 are weighted appropriately in order to tune the hue, saturation, and luminance of the colour pixel. The weighting of each of the R, G, and B sub-pixels 1102-1106 determines the area of each of the R, G, and B sub-pixels 1102-1106.

FIG. 11 shows the blaze angle, p, of the R sub-pixel 1102. In general, the optimized blaze angle for each of the R, G and B sub-pixels 1102-1106 may be slightly different to maximize the diffraction efficiency of the corresponding grating at its diffraction wavelength. The blaze angles of the blazed grating arrays may be fine-tuned using finite element electromagnetic simulations for each primary colour.

Figure 12:
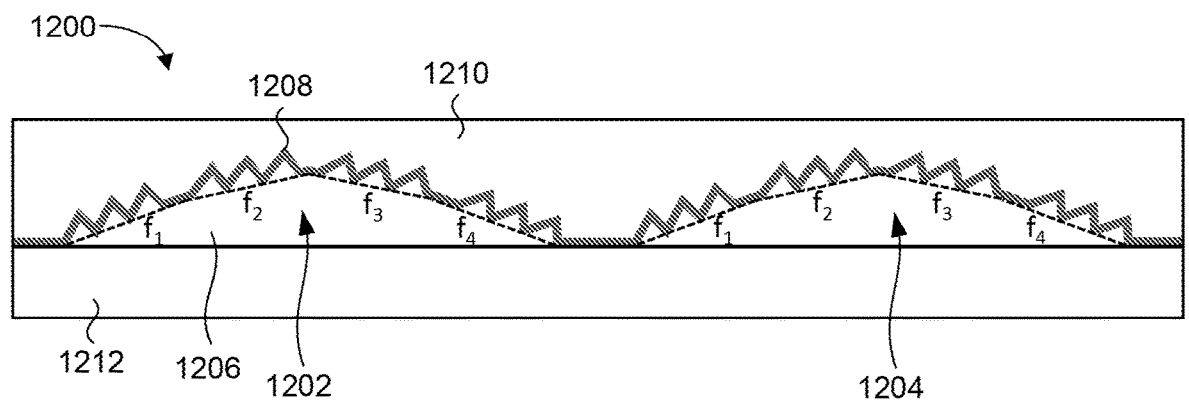
FIG. 12 shows an example cross sectional view of a portion of a manufactured diffractive display according to an embodiment of the present disclosure.

FIG. 12 shows a cross-sectional view an example embodiment of a diffractive display 1200 that is provided by a multi-layer stack. The cross sectional view shown in FIG. 12 includes two micro-pixels 1202 and 1204, each including four micro-facets, labelled $f_1$ to $f_4$ that each include blazed grating arrays on their surfaces. In this embodiment, the micro-pixels 1202, 1204, micro-facets and blazed gratings are formed on the surface of base 1206 formed from an ultraviolet cured resin, referred to as a UV resin.

The UV resin is generally optically transparent and may have a low refractive index (LRI), such as for example, $n_r \approx 1.4$. To reflect light, the surface of micro-facets and blazed gratings is covered with either thin film 1208 of a reflective material. In one example, the thin film 1208 may a material having a high refractive index, such as Silicon, $TiO_2$ or $Nb_2O_5$ approximately 60 nm to 400 nm thick. In another example, the thin film 1208 may be a thin film of a metal, such as for example Al, Ag, Au, that is approximately 30 nm to 80 nm thick.

Depending on the application, the UV resin base 1206 and the thin film 1208 may be encapsulated between a top layer 1210 and a bottom layer 1212 of a LRI material for mechanical and chemical protection.

The diffraction efficiency of blazed gratings is optimized for a range of illumination angles with respect to the micro-facet tilt angle, and the diffracted electromagnetic power channeled into the fundamental order is monitored to be maximized against the blazed angle.

In an example, base 1206 of the multilayered diffractive display 1200 shown in FIG. 12, which includes the angled micro-facets and the diffractive nano-structures, may be formed using a mold. The mold is formed with a reverse of the desired micro-facets and diffractive nano-structure arrays and is stamped onto resin to replicate the pattern by mechanical deformation.

FIGS. 13A to 13D are cross sectional views of example stages that may be utilized for forming a mold, or for manufacturing the display itself. FIGS. 13A to 13D, and the accompanying description, disclose one example method of a mold, and a person skilled in the art would understand that there may be other suitable methods to prepare a mold for use in manufacturing a diffractive display according to the present disclosure. Additionally, a person skilled in the art would understand that techniques other than the disclosed techniques may be utilized to perform the steps of the described method for preparing a mold.

The diffractive display being manufactured in the following description includes micro-pixels having a concave shape and including four micro-facets, $f_1$-$f_4$. The cross sectional views in FIGS. 13A-13D show two micro-pixels.

Figure 13A:
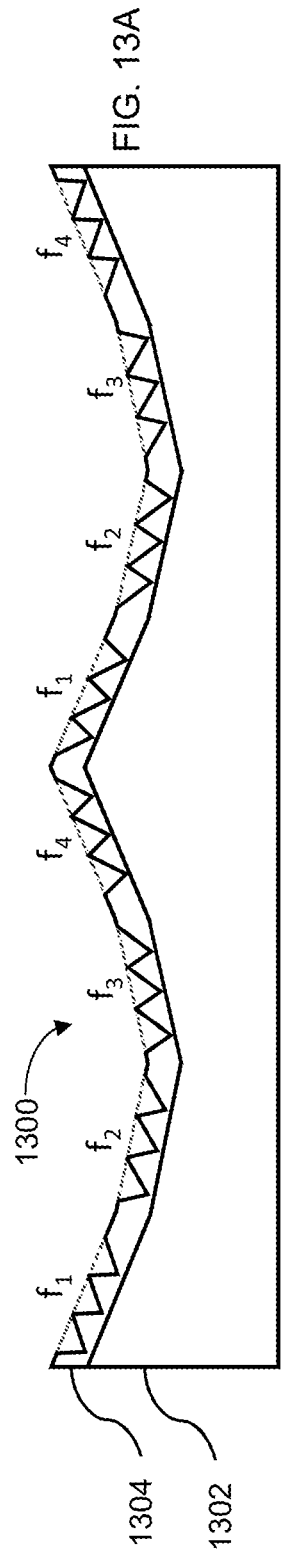
FIGS. 13A to 13D show cross sectional views of different stages of manufacturing a mold for a diffractive display according to an embodiment of the present disclosure.

The first step in preparing a mold is to prepare a model 1300 of the diffractive nano-structure arrays on top of the micro-facets of the 3D micro-pixels. FIG. 13A shows a model formed formed from silicon wafer 1302 and having a thin coating of electron beam (e-beam) resist 1304. In the present disclosure, the model 1300 is formed using e-beam lithography.

The first stage in forming the model 1300 is forming the 3D micro-pixel structures on the silicon wafer substrate 1302. Specifically, in the present description, grey-scale lithography is utilized.

A layer of positive e-beam resist approximately 2 μm is coated on the silicon wafer substrate 1302 using spin coating methods. The thickness of the e-beam resist may be empirically fine-tuned to provide the required contrast curve. The e-beam resist contrast curve may be measured for a specific e-beam energy, for example 50 kV, e-beam size and depth of focus, and the subsequent development processes may be accomplished and reproduced with the same e-beam conditions.

The surface profile of desired 3D microstructures may be approximated with piecewise linear approximation as a part of implementing the grey-scale e-beam lithography. The surface area of a 3D microstructure may be discretized into rectangular divisions with differently modulated resist heights. The dimensions of discretized divisions and size of the micro-pixel may be interrelated, meaning that every micro-pixel area is divided into an integer number of divisions. Each division may be algorithmically scanned with electrons of different energies. The energy level of the scanning e-beam may be algorithmically set in regards with the e-beam resist height within each division.

Formation of 3D shaped microstructures on e-beam resist involves exposing their entire surface area with high energy electrons. The impact of electron forward scattering and backscattering on the neighbouring divisions when exposing an arbitrary division is therefore substantial. A correction mechanism accounting for the electron forward scattering and backscattering effects, known as proximity effect correction, may be algorithmically implemented in order to deliver the correct amount of total electron energy to each division.

The versatility of the utilizing grey-scale e-beam lithography enables producing arbitrarily shaped microstructures. A wide number of differently shaped micro-pixels such as microcylinders, micro-pyramids, micro-domes, bi-facets, and quadra-facets may be integrated onto a single resist layer to construct a multi-view display. The surface area of the multi-view display may be populated with a periodic plurality of a single micro-pixel type, or with several regions populated with different types of micro-pixels.

The flexibility of grey-scale e-beam lithography for patterning arbitrarily shaped microstructures may be limited by two main factors: 1) resolving sharp and vertical resist profile may be limited by several factors including the resist contrast curve, beam size and electron scattering; and 2) lateral exposure of the resist as a result of electron forward scattering and backscattering. The negative impact of lateral exposure that it may result in rounding the sharp and vertical facets of microstructures.

After e-beam lithography is performed, the resist may be chemically developed to remove the exposed regions and form 3D microstructures on the resist surface. Nano-scale roughness on the surface of the microstructures may be smoothed using a gentle thermal reflow. The removal of the surface roughness may be desirable because the resist is dry etched in the subsequent step and a scaled-up version of the nano-scale roughness will be transferred on the target substrate.

Dry etching may be used to transfer the e-beam resist pattern onto the underlying substrate. The substrate 1302 described here is silicon, but other hard substrates, such as quartz, can also be micropatterned using the above process. The etching selectivity, defined as the ratio between the resist etch rate and the substrate etch rate, determines the depth of final microstructures engraved into the underlying substrate. A depth of 2-8 μm may be suitable, which corresponds to a controllable selectivity substantially greater than 1.

The appropriate gas chemistry should be utilized for the particular substrate material utilized to achieve the required selectivity. For a silicon substrate, a combination of fluorine-based etching gases including $CHF_3$ and $SF_6$ along with $O_2$ may be utilized. $CHF_3$ and $SF_6$ contribute to the surface passivation and etching of silicon, respectively, and $O_2$ may be used to fine-tune the resist etch rate and thus the etch selectivity.

Once the 3D micro-pixels are generated, the diffractive nano-structure arrays on top of the micro-facets are formed. To overlay 3D shaped nanostructure arrays on the facets of 3D shaped micro-pixels, a thin layer of e-beam resist may be transferred onto the surface of dry etched microstructures followed by a subsequent e-beam lithography step. A dry coating process may be used to conformally transfer the thin resist onto the microstructures. First, a PDMS coated carrier wafer may be $O_2$ plasma treated and spin coated with the desired thickness of e-beam resist. Second, the spun e-beam resist may be transferred on the micropatterned silicon wafer substrate 1302 by bringing the faces of the coated carrier wafer and the micropatterned wafer 1302 into close contact under high mechanical pressure and under applied heating in vacuum. The $O_2$ plasma treatment facilitates the coated e-beam resist peeling off the PDMS layer and conformally adhering to the micropatterned surface of the substrate 1302. Third, the carrier wafer may be detached from the micropatterned wafer, which may then be conformally coated with the thin layer 1302 of e-beam resist.

The micropatterned wafer 1302 coated with the thin film 1304 of e-beam resist may be processed with a subsequent e-beam lithography step to lay out the image, made by the nano-structure arrays on micro-facets. Sawtooth blazed grating arrays, for example, may be formed using grayscale e-beam lithography. The tilted facet of a single blazed grating may be estimated with piecewise linear approximation and thus several layers of different height. Distinct e-beam energy levels may be delivered to the different layers in order to construct the 3D surface profile of blazed nano-structure arrays. The primary part of the proximity effect may be algorithmically corrected to minimize the electron scattering effects. The piecewise approximation should ideally result in a multi-step blazed grating, but the secondary electron scattering effects, e-beam blur, and the sloped contrast curve ease smoothening the blazing facet. The e-beam resist layer 1304 may be chemically developed and dehydrated using a gentle thermal reflow process, which also aids smoothening the blazed nanostructures.

Figure 13B:
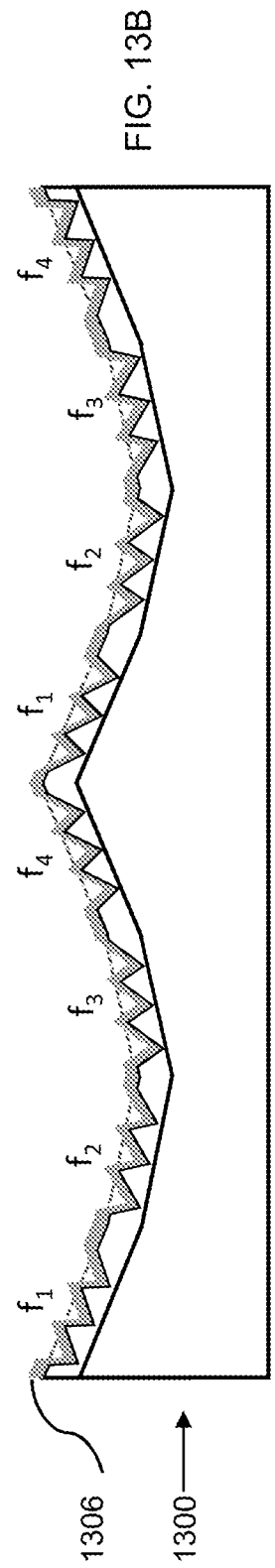

Now the model 1300 may be utilized for preparing a mold. To fabricate a nickel mold, a thin film seed layer 1306 of nickel seed layer is conformally deposited on the nanopatterned e-beam resist layer 1302, as shown in FIG. 13B. Physical vapor deposition with sputtering techniques may be utilized to obtain conformal coating of the nickel seed layer and the film thickness may be kept between 50 to 100 nm to avoid developing a high stress thin film and deforming the resist.

Figure 13C:
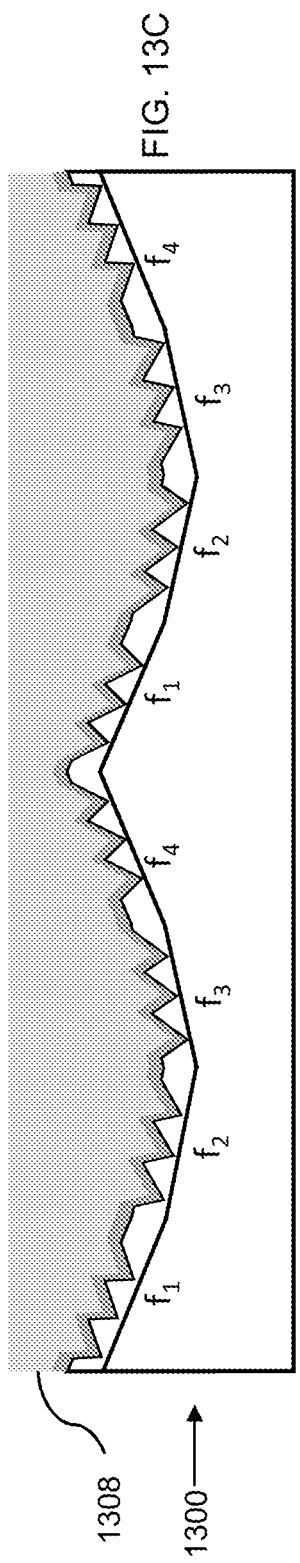

Once the seed layer 1308 is successfully coated, the stack of micro-patterned silicon wafer, nanopatterned resist, and the conformally coated seed layer may be transferred to an electroplating bath. In this bath, electrical current directly passes through an electrolyte containing particles of targeted electroforming material, and the particles are gradually deposited on the seed layer to grow a several microns thick electroplated film 1308, as shown in FIG. 13C. Subsequent phases of electroforming with increasing duty cycles of current pulsing may be applied to control the growth rate of the electroplated film 1308. In the beginning of the process, the growth rate may be maintained low to preserve the shape of nanostructures and transfer fidelity. Further into the process when few microns of nickel are plated, the current pulses with longer duty cycles may be applied to increase the growth rate.

Figure 13D:
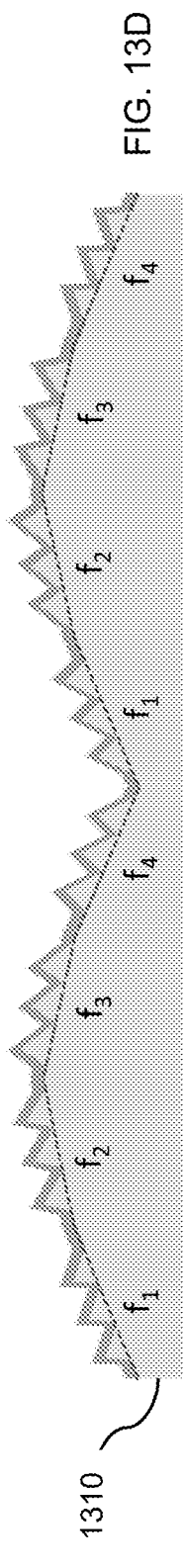

After the electroplating process is completed, the mold 1310 formed through electroplating is removed from the model 1300, as shown in FIG. 13D. The mold is a reverse of the desired image and is stamped onto resin to replicate the pattern by mechanical deformation. Although the previous description describes producing a nickel mold, other suitable materials may be utilized to produce a mold that is mechanically durable for pattern replication as described below.

The mold 1310, or master, may be utilized to produce one or several sub-masters or replicas. A sub-master may be used for imprinting of nano-patterned multi-faceted pixels on photopolymer resin supported by a flexible, low refractive index, and transparent substrate such as Polyethylene terephthalate (PET). The imprinting process may involve the application of mechanical pressure to stamp the mold on the liquid photopolymer resin, followed by exposure to light, commonly UV light, to cure the imprinted photopolymer resin. After detaching the mold 1302 from the imprinted resin, the microstructures and nanostructures are transferred with a certain structural fidelity, which relates to the imprinting conditions, such as temperature and pressure, and resin shrinkage during the curing process. The imprinted resin may form the base, similar to the example base 1206 in the example diffractive display 1200 describe previously.

The sub-masters may also be used in a thermal embossing process, where a thermoplastic polymer resin is stamped with the image pattern and then adequately heated above the glass transition temperature of the polymer.

The sub-master may alternatively be used in a step-and-repeat imprint lithography process to generate a roll mold. Both photopolymer and thermoplastic polymer may be utilized for producing the roll mold. The recombined roll mold may then be applied for large-area imprinting purposes. Large-area imprinting process can be conducted by roll-to-roll (R2R), or roll-to-plate (R2P), or plate-to-plate (P2P) imprinting.

After the imprinted resin is formed, a highly reflective or refractive thin film may be incorporated onto the surface of the imprinted resin to efficiently steer the diffracted light into the observer, similar to the thin film 1208 of the example diffractive display 1200 shown in FIG. 12. Such thin films may be coated on the imprinted resin using physical vapour deposition techniques. The deposition rate and pressure may be fine-tuned to control the thin film quality and reflectance. Once the thin film of reflective or refractive material is deposited, the imprinted resin and thin film may be encapsulated in a LIR material, similar to the top layer 1210 and bottom layer 1212 of the example diffractive display 1200 shown in FIG. 12.

Embodiments of the present disclosure provide diffractive displays that include 3D micro-pixels that provide multiple micro-facets having surface normal that are non-parallel. The micro-facets include one or more diffractive nano-structure arrays. In some embodiments, the diffractive nano-structure arrays may be utilized to alter an azimuthal angle of the viewing angle of the light diffracted by a diffractive nano-structure array, but is limited in the variation of the polar angle by the diffractive nano-structure array. By having multiple micro-facet surfaces that are tilted relative to each other, a greater degree of freedom for varying the viewing angles of light diffracted from the diffractive nano-structure arrays in both polar and azimuthal angles is facilitated. This greater degree of freedom facilitates providing diffractive displays with wider viewability compared to conventional diffractive displays, as well as enabling parallax in one-axis, two-axes, or full parallax. The parallax may be utilized to provide images that vary in perspective or animated images.

In the preceding description, for purposes of explanation, numerous details are set forth in order to provide a thorough understanding of the embodiments. However, it will be apparent to one skilled in the art that these specific details are not required.

The above-described embodiments are intended to be examples only. Alterations, modifications and variations can be effected to the particular embodiments by those of skill in the art without departing from the scope, which is defined solely by the claims appended hereto.

What is claimed is:

1. A diffractive display for displaying a plurality of images, each image displayed at a unique view zone, the diffractive display comprising:
   a plurality of micro-pixels, each micro-pixel comprising a plurality of micro-facets, each micro-facet of a micro-pixel having a surface normal that is non-parallel to the surface normal of the other micro-facets of the micro-pixel;
   each micro-facet having at least one diffractive nano-structure array;
   wherein each of the at least one diffractive nano-structure array has a viewing angle at which incident light is diffracted from the diffractive nano-structure array as diffracted light, the viewing angle being based on an angle of the surface normal of the micro-facet on which the diffractive nano-structure array is provided and an azimuthal angle and a polar angle of the fundamental order of diffraction of the diffractive nano-structure array, and the diffracted light having a hue and an intensity based on properties of the diffractive nano-structure array; and
   wherein, for each of the plurality of images, each of the plurality of micro-pixels includes at least one diffractive nano-structure array for which the viewing angle corresponds to the view zone the image, such that each of the plurality of images is composed of the diffracted light from at least one diffractive nano-structure array from each of the plurality of micro-pixels.

2. The diffractive display according to claim 1, wherein the surface normals of the plurality of micro-facets of each micro-pixel differ in polar angle but are substantially parallel in azimuthal angle such that the polar angle of the viewing angle of diffracted light from each diffractive nano-structure is primarily determined by the polar angle of the micro-facet of the diffractive nano-structure array.

3. The diffractive display according to claim 2, wherein each micro-facet of each micro-pixel includes a first plurality of diffractive nano-structure arrays that are configured such that the azimuthal angle of the viewing angle of each of the first plurality of diffractive nano-structure arrays varies from the azimuthal angles of the viewing angles of the others of the first plurality of diffractive nano-structures.

4. The diffractive display according to claim 3, wherein each of the first plurality of diffractive nano-structure arrays include one or more blazed grating arrays, and the hue of the diffracted light is determined by a periodicity of each of the one or more blazed grating arrays, and the intensity is determined by an area of each of the one or more blazed gratings.

5. The diffractive display according to claim 4, wherein each of the first plurality of diffractive nano-structure arrays is about 300 nm or more in width, and each of the blazed grating arrays have a respective periodicity that is between about 300 nm and about 700 nm and a respective blaze angle of between about 20° and about 30°.

6. The diffractive display according to claim 4, wherein each of the first plurality of the diffractive nano-structure arrays comprise a plurality of blazed grating arrays that have substantially parallel viewing angles, blazed grating arrays associated with a diffractive nano-structure array are each associated with a respective color and have a periodicity that corresponds to a wavelength of light of the associated color and have an area that is associated with an intensity of the associated color, such that the colors and intensities of the diffracted light from each of the plurality of blazed grating arrays combine to provide the hue and intensity of diffracted light from the diffractive nano-structure array associated with the plurality of blazed grating arrays.

7. The diffractive display according to claim 6, wherein each of the plurality of blazed grating arrays includes:
 a red sub-pixel grating array having a periodicity of about 416 nm and a blaze angle of between about 20° and 30°;
 a green sub-pixel grating array having a periodicity of about 512 nm and a blaze angle of between about 20° and 30°; and
 a blue sub-pixel grating array having a periodicity of about 608 nm and a blaze angle of between about 20° and 30°.

8. The diffractive display according to claim 4, wherein an orientation the one or more blaze grating arrays of each of the first plurality of diffractive nano-structures are rotated about the normal of the micro-facet relative to an orientation of the one or more blaze grating arrays of the others of the first plurality of diffractive nano-structure to provide varying azimuthal angles of the diffracted light.

9. The diffractive display according to claim 3, wherein, for each micro-pixel, the first plurality of diffractive nano-structure arrays in a particular micro-facet are configured such that the diffracted light from each of the first plurality of diffractive nano-structure arrays of the particular micro-facet have substantially the same hue and intensity.

10. The diffractive display according to claim 3, wherein, for at least some of the micro-facets of at least some of the micro-pixels, the first plurality of diffractive nano-structure arrays are configured such that the diffracted light diffracted from the first plurality of diffractive nano-structure arrays varies in hue, or intensity, or in both hue and intensity compared to diffracted light diffracted from the first plurality of diffractive nano-structures of the other micro-facets of the micro-pixel such that different images are displayed at view zones differing in azimuthal angle but having substantially the same polar angle.

11. The diffractive display according to claim 10, wherein, for each micro-pixel, each of the micro-facets of that micro-pixel include substantially the same set of the first plurality of diffractive nano-structure arrays such that substantially the same image is displayed at view zones having different polar angle but having substantially the same azimuthal angle.

12. The diffractive display according to claim 10, wherein, for at least some of the micro-pixels, at least some of the first plurality of diffractive nano-structure arrays are configured such that the diffracted light diffracted from the first plurality of diffractive nano-structure arrays varies in hue, or intensity, or in both hue and intensity compared to diffracted light diffracted from the first plurality of diffractive nano-structures of the other micro-facets of the micro-pixel such that different images are displayed at different viewing zones along the same azimuthal angle.

13. The diffractive display according to claim 12, wherein the first plurality of diffractive nano-structures are configured such that the combination of polar and azimuthal angles of the diffracted light from each of the first plurality of diffractive nano-structures varies from the combination of polar and azimuthal angles of the others of the first plurality of diffractive nano-structures, such that different images are displayed at different viewing zones along any axis.

14. The diffractive display according to claim 1, wherein the surface normals of the plurality of micro-facets of each micro-pixel differ in azimuthal angle and polar angle such that the polar component of the viewing angle of diffracted light from each diffractive nano-structure is determined primarily by the polar component of the angle of the surface normal of the micro-facet, and the azimuthal component of the viewing angle of the diffracted light is determined by the azimuthal component of the surface normal angle of the micro-facet and the azimuthal component of the fundamental order of diffraction of the diffractive nano-structure.

15. The diffractive display according to claim 14, wherein, for each micro-pixel, the at least one diffractive nano-structure array of a particular micro-facet is configured such that the polar and azimuthal angles of the viewing angle of the diffracted light from the at least one diffractive nano-structure arrays varies from the polar and azimuthal angles of the at least one diffractive nano-structure array of others of micro-facets of the micro-pixel, such that the images are displayed at view zones that do not in a grid arrangement.

16. The diffractive display according to claim 1, wherein the micro-pixels have sides that are between about 20 μm and about 80 μm.

17. The diffractive display according to claim 1, wherein each micro-facet includes a plurality of micro-planes, each micro-plane including at most one of the plurality of diffractive nano-structures and having sides that are between about 300 nm and about 12 μm.

* * * * *

UNITED STATES PATENT AND TRADEMARK OFFICE
CERTIFICATE OF CORRECTION

PATENT NO. : 12,470,688 B2  
APPLICATION NO. : 18/257640  
DATED : November 11, 2025  
INVENTOR(S) : Milad Khoshnegar Shahrestani and Clinton K. Landrock Page 1 of 1

It is certified that error appears in the above-identified patent and that said Letters Patent is hereby corrected as shown below:

In the Specification  
In Column 3, Line 38: Replace "200" with "20°"  
In Column 6, Line 41: Replace "200" with "20°"  
In Column 10, Line 22: Replace "T" with "φ"  
In Column 10, Line 25: Replace "T" with "φ"  
In Column 13, Line 49: Replace "p" with "β"

Signed and Sealed this  
Sixteenth Day of December, 2025

John A. Squires  
*Director of the United States Patent and Trademark Office*